US012650389B2

(12) United States Patent
Rim et al.

(10) Patent No.:  US 12,650,389 B2
(45) Date of Patent:       Jun. 9, 2026

(54) OPTICAL MEASUREMENT APPARATUS, OPTICAL MEASUREMENT METHOD USING THE SAME, AND METHOD FOR MANUFACTURING SEMICONDUCTOR DEVICE USING THE SAME

(71) Applicant: Samsung Electronics Co., Ltd., Suwon-si (KR)

(72) Inventors: Min Ho Rim, Suwon-si (KR); Young Hoon Sohn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 18/469,107

(22) Filed: Sep. 18, 2023

(65) Prior Publication Data

US 2024/0219314 A1      Jul. 4, 2024

(30) Foreign Application Priority Data

Jan. 3, 2023    (KR) ......................... 10-2023-0000700

(51) Int. Cl.
| | | |
|---|---|---|
| *G01N 21/95* | (2006.01) | |
| *G01N 21/88* | (2006.01) | |
| *G01N 21/956* | (2006.01) | |

(52) U.S. Cl.
CPC ..... *G01N 21/9501* (2013.01); *G01N 21/8806* (2013.01); *G01N 21/9505* (2013.01);
(Continued)

(58) Field of Classification Search
CPC ............. G03F 7/70605; G03F 7/70608; G03F 7/70616; G03F 7/70625; G03F 7/7065;
G03F 7/70653; G03F 7/706843; G03F 7/706847; G03F 7/706849; G03F 7/706851; G01B 11/24; G01B 11/30; G01B 11/303; G01B 11/306; G01B 11/16; G01B 11/002;
(Continued)

(56) References Cited

U.S. PATENT DOCUMENTS

| | | | | |
|---|---|---|---|---|
| 4,933,567 A | * | 6/1990 | Silva .................. | G01N 21/9505 356/369 |
| 4,978,862 A | * | 12/1990 | Silva .................. | G01N 21/9505 356/369 |

(Continued)

FOREIGN PATENT DOCUMENTS

| | | | | | |
|---|---|---|---|---|---|
| CN | | 113848213 A | * | 12/2021 | ......... G01N 21/9501 |

*Primary Examiner* — Gordon J Stock, Jr.
(74) *Attorney, Agent, or Firm* — Wolf, Greenfield & Sacks, P.C.

(57)       ABSTRACT

A method for manufacturing a semiconductor device includes generating light, modulating power of the light to generate power-modulated light, acquiring an image signal of a measurement target using the power-modulated light, filtering the image signal to separate a real signal and a false signal, analyzing the measurement target using the real signal, and performing a semiconductor process on the measurement target based analyzing the measurement target using the real signal, wherein filtering the image signal includes classifying a first component of the image signal that is dependent on power of the power-modulated light as the real signal, and classifying a second component of the image signal that is independent of the power of the power-modulated light as the false signal.

20 Claims, 20 Drawing Sheets

(52) U.S. Cl.
CPC .................. *G01N 21/95607* (2013.01); *G01N 2021/8845* (2013.01)

(58) Field of Classification Search
CPC ....... G01B 11/02; G01B 11/03; G06T 7/0002; G06T 7/0004; G06T 7/0008; G06T 2207/30148; G06T 2207/10152; G01N 21/55; G01N 21/47; G01N 21/88; G01N 21/8803; G01N 21/8806; G01N 21/8851; G01N 21/94; G01N 21/9501; G01N 21/9503; G01N 21/9505; G01N 21/956; G01N 21/95607; G01N 21/95623; G01N 2021/8461; G01N 2021/8835; G01N 2021/8845; G01N 2021/8838; G01N 2021/8854; G01N 2021/8887; G01N 2021/8896; G01N 2021/8861; G01N 2021/8858; G01N 2021/8864; G01N 2021/8874; G01N 2021/8867; G01N 2021/887; G01N 2021/95615; G01N 2021/9563

See application file for complete search history.

(56) References Cited

U.S. PATENT DOCUMENTS

| | | | | |
|---|---|---|---|---|
| 5,026,976 | A | 6/1991 | Miyatake | |
| 5,032,734 | A * | 7/1991 | Orazio, Jr. | ......... G01N 21/9501 |
| | | | | 250/559.46 |
| 6,124,926 | A * | 9/2000 | Ogawa | ............... G01N 21/9501 |
| | | | | 356/417 |
| 6,812,717 | B2 * | 11/2004 | Borden | ................ G01R 31/303 |
| | | | | 356/432 |
| 6,940,609 | B2 * | 9/2005 | Scheiner | .............. G01B 11/254 |
| | | | | 356/612 |
| 7,106,446 | B2 | 9/2006 | Nicolaides et al. | |
| 7,397,557 | B2 * | 7/2008 | Jeong | .............. G01N 21/95623 |
| | | | | 359/559 |
| 7,460,218 | B2 * | 12/2008 | Schwarz | ........... G01N 21/8422 |
| | | | | 356/237.4 |
| 7,782,913 | B2 | 8/2010 | Gollier | |
| 8,581,979 | B2 * | 11/2013 | Chou | ..................... H04N 23/56 |
| | | | | 359/223.1 |
| 8,649,024 | B2 * | 2/2014 | Colonna de Lega | ........................ G01B 11/2518 |
| | | | | 356/601 |
| 8,804,112 | B2 | 8/2014 | Shibata et al. | |
| 9,318,869 | B2 | 4/2016 | Chuang et al. | |
| 9,450,536 | B2 | 9/2016 | Nakanishi et al. | |
| 9,509,112 | B2 | 11/2016 | Chuang et al. | |
| 9,983,144 | B2 * | 5/2018 | Hashimoto | ........ G01N 21/9501 |
| 10,533,954 | B2 | 1/2020 | Nicolaides et al. | |
| 11,156,565 | B2 | 10/2021 | Matsumoto et al. | |
| 11,333,871 | B2 * | 5/2022 | Geiger | ...................... G06T 5/73 |
| 11,340,437 | B2 * | 5/2022 | Langlois | ................ G02B 27/60 |
| 11,913,874 | B2 * | 2/2024 | Shchegrov | ........... G01N 21/211 |
| 12,209,961 | B2 * | 1/2025 | Foley | ................. G01B 11/0633 |
| 12,222,282 | B2 * | 2/2025 | Jeong | ................ G01B 11/2441 |
| 12,345,658 | B2 * | 7/2025 | Romanovsky | ..... G01N 21/8806 |
| 2007/0013902 | A1 * | 1/2007 | Backhauss | ......... G01N 21/8806 |
| | | | | 356/237.5 |
| 2021/0356408 | A1 | 11/2021 | Yacoubian | |
| 2024/0272058 | A1 * | 8/2024 | Pawlowski | ........ G03F 7/70275 |

* cited by examiner

OPTICAL MEASUREMENT APPARATUS, OPTICAL MEASUREMENT METHOD USING THE SAME, AND METHOD FOR MANUFACTURING SEMICONDUCTOR DEVICE USING THE SAME

CROSS-REFERENCE TO RELATED APPLICATION

This application claims priority from Korean Patent Application No. 10-2023-0000700, filed on Jan. 3, 2023, in the Korean Intellectual Property Office, and all the benefits accruing therefrom under 35 U.S.C. 119, the contents of which in its entirety are herein incorporated by reference.

BACKGROUND

Technical Field

The present disclosure relates to an optical measurement apparatus, an optical measurement method using the same, and a method for manufacturing a semiconductor device using the same. More specifically, the present disclosure relates to an optical measurement apparatus for measuring a three-dimensional (3D) structure, an optical measurement method using the same, and a method for manufacturing a semiconductor device using the same.

Description of Related Art

As diversity of a semiconductor device manufacturing process increases and mass production of a semiconductor device accelerates, measurement technology to immediately inspect absence or presence of a defect in a semiconductor wafer at each of steps of the semiconductor device manufacturing process is becoming more important.

A semiconductor device with a three-dimensional structure is being produced due to miniaturization of the semiconductor device. Electron beam inspection or destructive inspection may be performed to inspect a defect of the semiconductor device having the three-dimensional structure, for example, to detect a defect present in a lower portion of the semiconductor device. However, this inspection scheme requires significant time and cost. Thus, inspection using optical measurement is continuously requested.

SUMMARY

A technical purpose to be achieved by the present disclosure is to provide a method for manufacturing a semiconductor device having a three-dimensional structure using an optical measurement apparatus capable of precise and fast analysis of the semiconductor device having a three-dimensional structure.

Another technical purpose to be achieved by the present disclosure is to provide an optical measurement apparatus capable of precise and fast analysis of a three-dimensional semiconductor device.

Still another technical purpose to be achieved by the present disclosure is to provide an optical measurement method capable of precise and fast analysis of a 3D semiconductor device.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

According to an aspect of the present disclosure, there is provided a method for manufacturing a semiconductor device, the method comprising generating light, modulating power of the light to generate power-modulated light, acquiring an image signal of a measurement target using the power-modulated light, filtering the image signal to separate a real signal and a false signal, analyzing the measurement target using the real signal, and performing a semiconductor process on the measurement target based a result of analyzing the measurement target using the real signal, wherein filtering the image signal includes classifying a first component of the image signal that is dependent on power of the power-modulated light as the real signal, and classifying a second component of the image signal that is independent of the power of the power-modulated light as the false signal.

According to another aspect of the present disclosure, there is provided an optical measurement apparatus comprising a light source configured to generate light, a light power modulator configured to modulate power of the light to generate power-modulated light, a first optical system configured to direct the power-modulated light toward the measurement target, and configured to output reflected light obtained when the power-modulated light is reflected from the measurement target, a sensing unit configured to sense the reflected light and to generate an image signal; and a processor configured to classify a component of the image signal that is dependent on light power of the power-modulated light as a real signal, and to analyze the measurement target based on the real signal.

According to still another aspect of the present disclosure, there is provided an optical measurement apparatus comprising a stage having a measurement target thereon, a light source configured to generate and output light including first and second light beams having different wavelength bands, a light power modulator configured to modulate power of the first light beam to generate a first power-modulated light beam and for modulating power of the second light beam to generate a second power-modulated light beam, a first optical system configured to direct the first power-modulated light beam incident on the measurement target at a first focal length, and to direct the second power-modulated light beam incident on the measurement target at a second focal length different from the first focal length, a second optical system including a first detector configured to detect a first reflected light beam obtained when the first power-modulated light beam is reflected from the measurement target, and a second detector configured to detect a second reflected light beam obtained when the second power-modulated light beam is reflected from the measurement target, a sensing unit including a first sensor configured to sense the first reflected light beam from the first detector and configured to generate a first image signal based on a sensing result, and a second sensor configured to sense the second reflected light beam from the second detector and configured to generate a second image signal based on a sensing result, a processor configured to analyze the measurement target using the first image signal and the second image signal.

BRIEF DESCRIPTION OF THE DRAWINGS

The above and other aspects and features of the present disclosure will become more apparent by describing in detail some embodiments thereof with reference to the attached drawings, in which:

FIG. 9 is an illustrative conceptual diagram for illustrating an optical measurement apparatus according to some embodiments.

Figure 11:
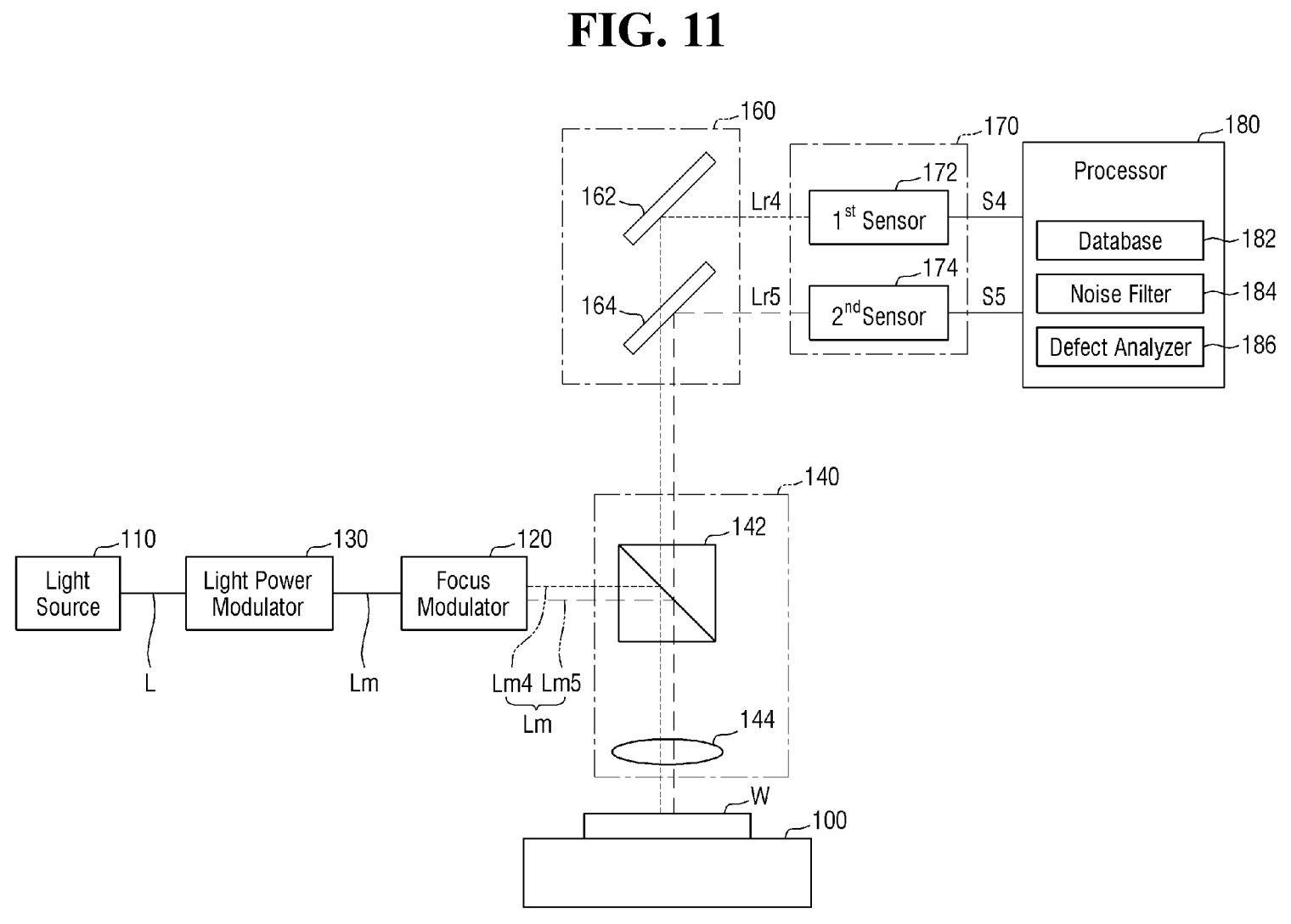

FIG. 11 is an illustrative conceptual diagram for illustrating an optical measurement apparatus according to some embodiments.

DETAILED DESCRIPTION

Figure 1:
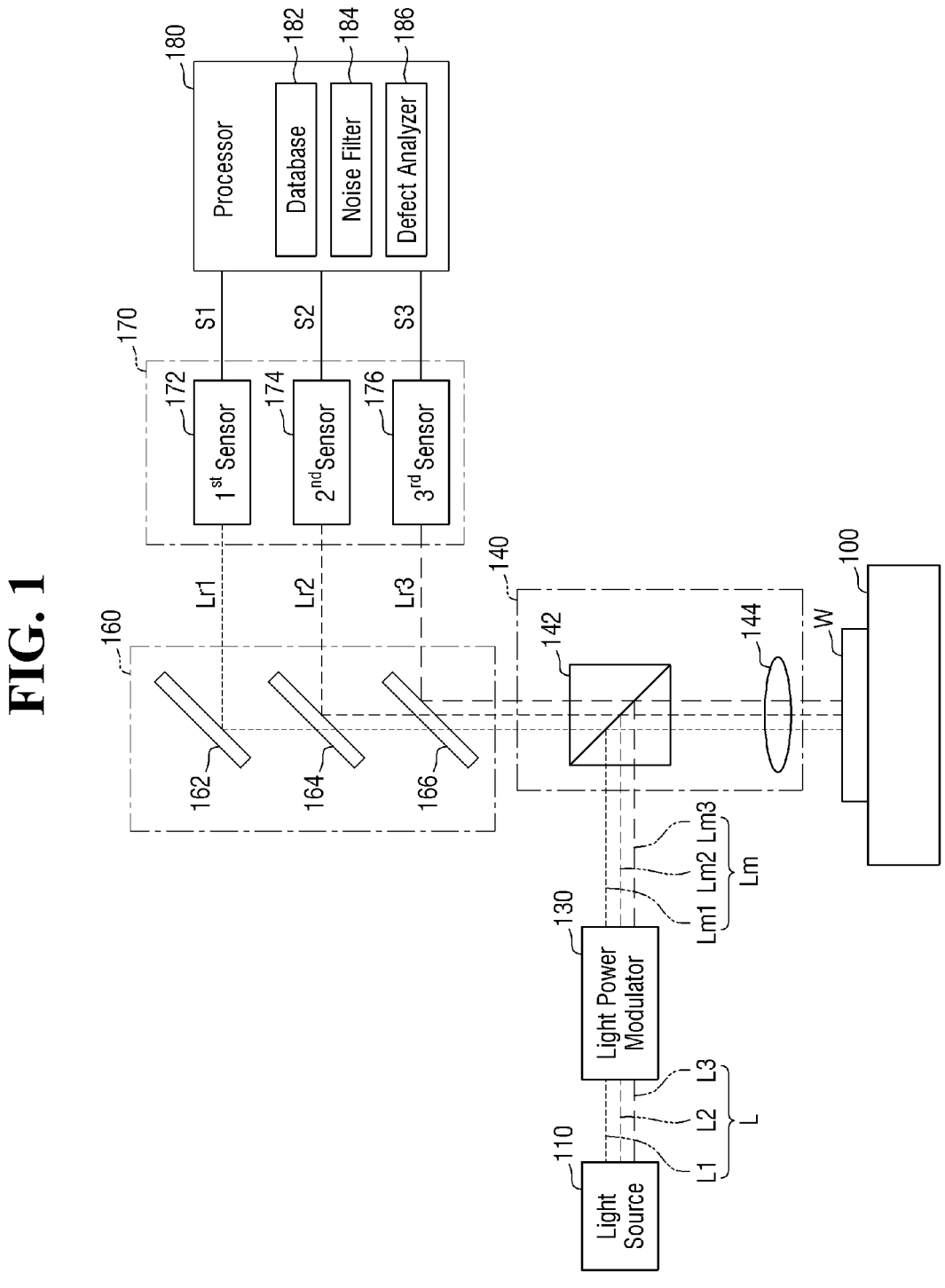
FIG. 1 is an illustrative conceptual diagram for illustrating an optical measurement apparatus according to some embodiments.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included in the spirit and scope of the present disclosure as defined by the appended claims.

A shape, a size, a ratio, an angle, a number, etc. disclosed in the drawings for illustrating embodiments of the present disclosure are illustrative, and the present disclosure may not be limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise," "comprising," "include," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D," this means C inclusive to D inclusive unless otherwise specified.

It will be understood that, although the terms "first," "second," "third," and so on may be used herein for illustrating various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be directly on or beneath the second element or may be indirectly on or beneath the second element with a third element or layer being between the first and second elements or layers. It will be understood that when an element or layer is referred to as being "connected to," or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be "on" or "on a top" of another layer, film, region, plate, or the like, the former may directly contact the latter or still another layer, film, region, plate, or the like may be between the former and the latter. As used herein, when a layer, film, region, plate, or the like is directly "on" or "on a top" of another layer, film, region, plate, or the like, the former directly contacts the latter and still another layer, film, region, plate, or the like is not between the former and the latter. Further, as used herein, when a layer, film, region, plate, or the like may be "below" or "under" another layer, film, region, plate, or the like, the former may directly contact the latter or still another layer, film, region, plate, or the like may be between the former and the latter. As used herein, when a layer, film, region, plate, or the like is directly "below" or "under" another layer, film, region, plate, or the like, the former directly contacts the latter and still another layer, film, region, plate, or the like is not between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as "after," "subsequent to," "before," etc., another event may occur therebetween unless "directly after," "directly subsequent," or "directly before" is not indicated.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as "beneath," "below," "lower," "under," "above," "upper," and the like, may be used herein for ease of explanation for illustrating one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations, and the spatially relative descriptors used herein should be interpreted accordingly.

Hereinafter, with reference to FIG. 1 to FIG. 15, an optical measurement apparatus according to some embodiments will be described.

Figure 2:
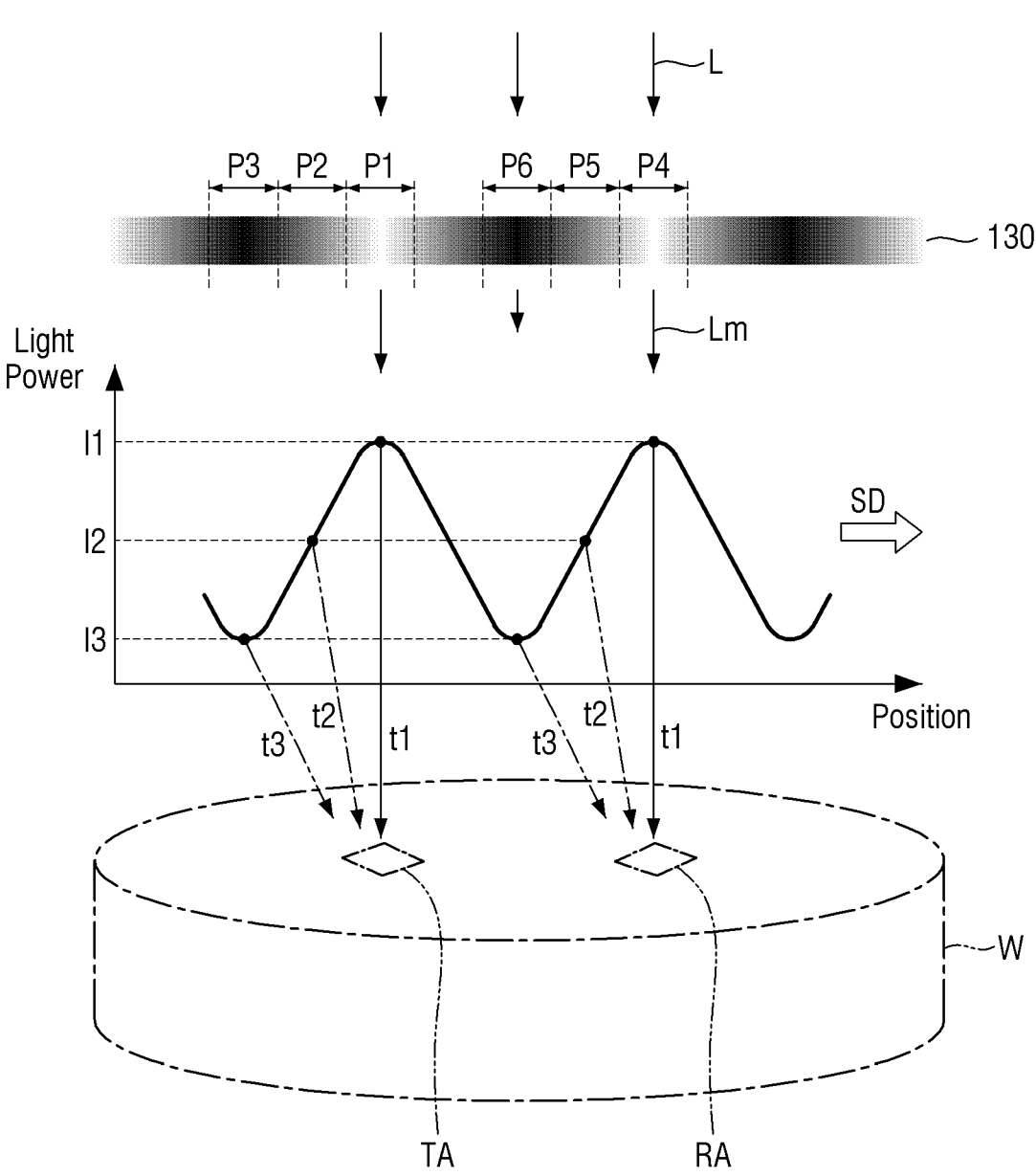
FIG. 2 is a conceptual diagram for illustrating light power modulation of the optical measurement apparatus of FIG. 1.
Figure 3:
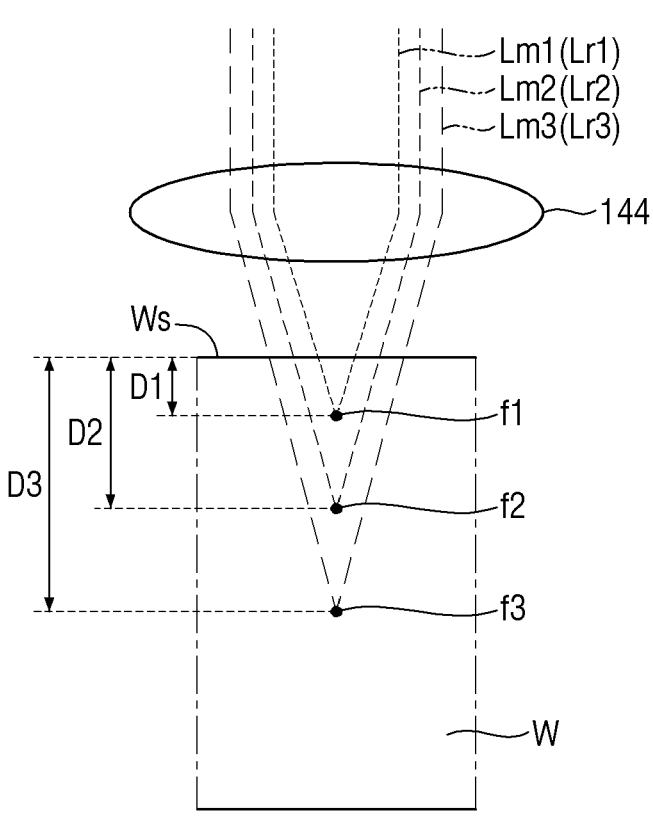
FIG. 3 is a conceptual diagram for illustrating focus modulation of the optical measurement apparatus of FIG. 1.
Figure 4:
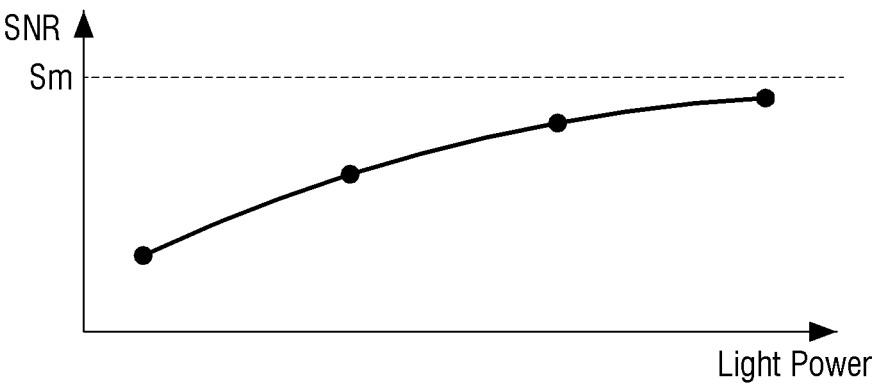
FIG. 4 is an illustrative graph for illustrating a relationship between light power and signal-to-noise ratio related to a defect in a semiconductor device.
Figure 5:
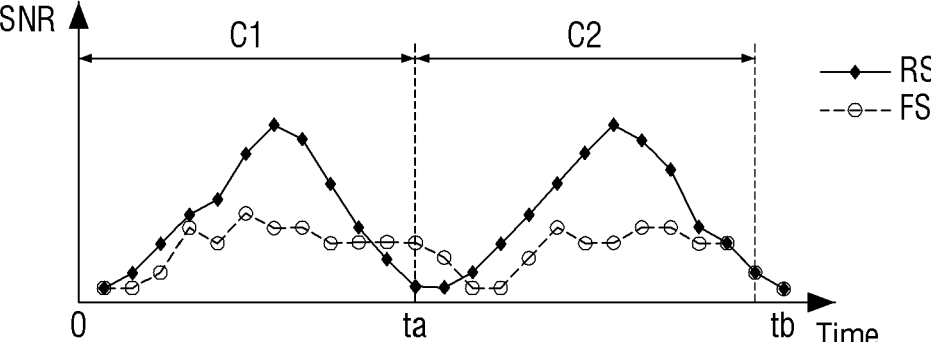
FIG. 5 is an illustrative graph for illustrating signal data generated by the optical measurement apparatus of FIG. 1.
Figure 6A:
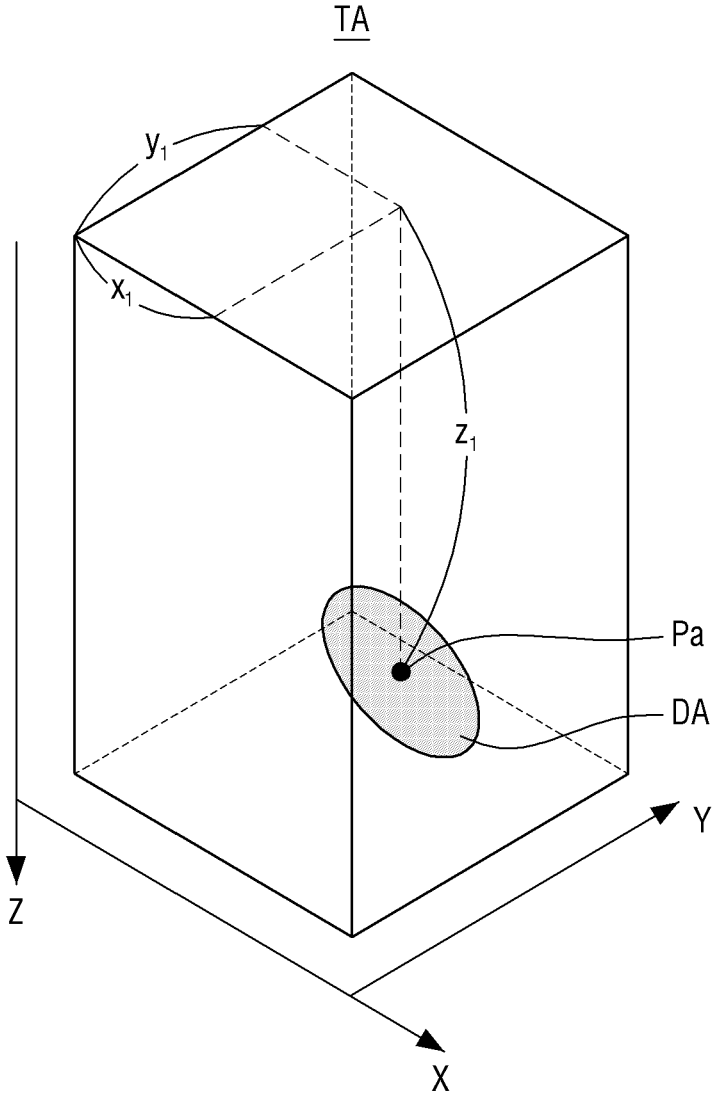
FIG. 6A is an illustrative diagram for illustrating 3D image data of the target area generated by the optical measurement apparatus of FIG. 1.
Figure 6B:
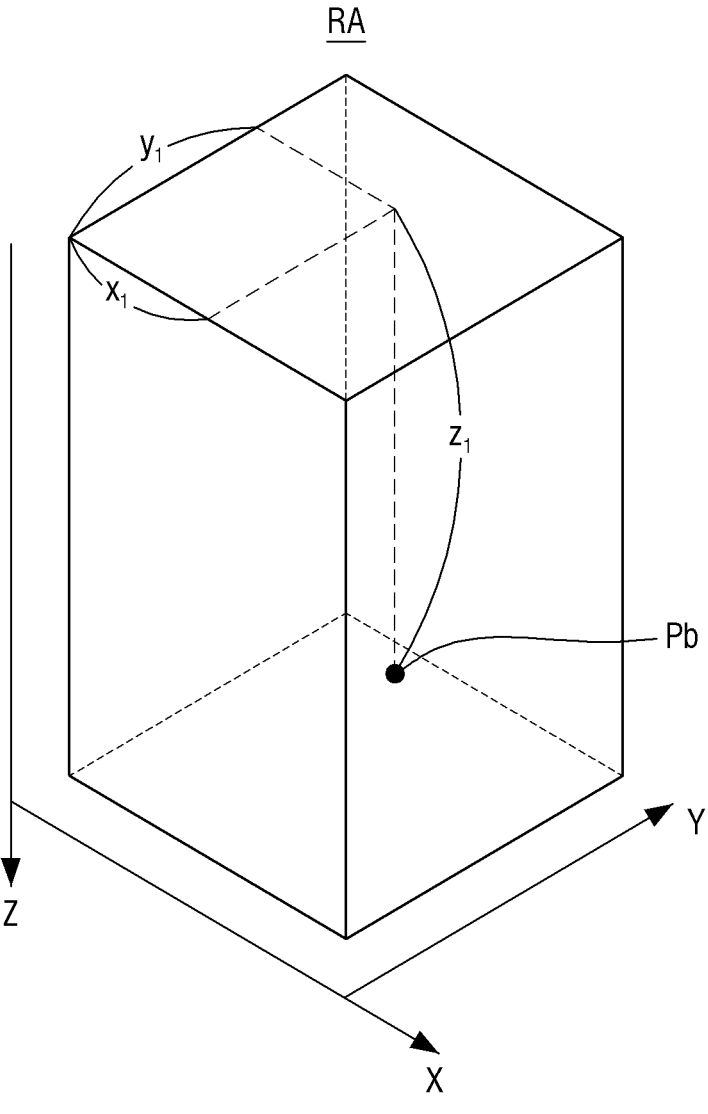
FIG. 6B is an illustrative diagram for illustrating 3D image data of a reference area generated by the optical measurement apparatus of FIG. 1.

FIG. 1 is an illustrative conceptual diagram for illustrating an optical measurement apparatus according to some embodiments. FIG. 2 is a conceptual diagram for illustrating light power modulation of the optical measurement apparatus of FIG. 1. FIG. 3 is a conceptual diagram for illustrating focus modulation of the optical measurement apparatus of FIG. 1. FIG. 4 is an illustrative graph for illustrating a relationship between light power and signal-to-noise ratio related to a defect in a semiconductor device. FIG. 5 is an illustrative graph for illustrating signal data generated by the optical measurement apparatus of FIG. 1. FIG. 6A is an illustrative diagram for illustrating 3D image data of the target area generated by the optical measurement apparatus of FIG. 1. FIG. 6B is an illustrative diagram for illustrating 3D image data of a reference area generated by the optical measurement apparatus of FIG. 1.

Referring to FIG. 1 to FIG. 6B, the optical measurement apparatus according to some embodiments includes a stage 100, a light source 110, a light power modulator 130, a first optical system 140, a second optical system 160, a sensing unit 170, and a processor 180.

The stage 100 may support a measurement target W thereon. For example, the measurement target W may be on the stage 100. In some embodiments, the stage 100 may be movable. For example, the stage 100 may be movable in a vertical direction or a horizontal direction so as to move the measurement target W thereon.

The light source 110 may generate and output light L. For example, the light source 110 may generate and output broadband or multi-wavelength light L. The broadband light may be multicolor light including light of a plurality of wavelength bands. The broadband light may have a wide wavelength range, for example, from an ultraviolet wavelength region (for example, about 100 nm to about 400 nm) to an infrared wavelength region (for example, about 750 nm to about 1,000 μm). In one example, the light source 110 may generate and output light in a wavelength range of about 150 nm to about 2,100 nm.

The light source 110 may be embodied as, for example, a halogen lamp light source or an LED light source generating continuous spectrum light. However, the present disclosure is not limited thereto.

In some embodiments, the light source 110 may generate the light L including a plurality of light beams (for example, L1, L2, and L3) having different predetermined wavelength bands. For example, the light L may include the first light beam L1 having a first wavelength band, the second light beam L2 having a second wavelength band greater than the first wavelength band, and the third light beam L3 having a third wavelength band greater than the second wavelength band. In one example, the first light beam L1 may be blue light, the second light beam L2 may be a green light, and the third light beam L3 may be red light.

The light power modulator 130 may modulate power of the light L emitted from the light source 110 and then may output power-modulated light Lm. The power of the light L may be referred to as intensity of the light L or a light amount thereof. The light power modulator 130 may include, for example, at least one of a modulated neutral density filter (a modulated ND filter), an electro-optic modulator (an EO modulator), or an acousto-optic modulator (an AO modulator). However, the present disclosure is not limited thereto.

Upon receiving the plurality of different light beams (e.g., the first to third light beams L1 to L3) from the light source 110, the light power modulator 130 may modulate the powers of the plurality of different light beams and may output a plurality of different modulated light beams (e.g., Lm1, Lm2, and Lm3). For example, the light power modulator 130 may modulate the power of the first light beam L1 and output the first modulated light beam Lm1, and may modulate the power of the second light beam L2 and output the second modulated light beam Lm2, and may modulate the power of the third light beam L3 and output the third modulated light beam Lm3. Since the first to third light beams L1 to L3 have different wavelength bands, the first to third modulated light beams Lm1 to Lm3 may also have different wavelength bands.

In some embodiments, the light power modulator 130 may perform spatial modulation on the power of the light L. That is, the light power modulator 130 may spatially modulate the power of the light L to generate the power-modulated light Lm. More specifically, the power of the power-modulated light Lm may vary based on a position of the measurement target W to which the power-modulated light Lm is incident.

For example, as shown in FIG. 2, the light power modulator 130 may have different transmittances in different areas thereof. Thus, when the light L propagates through the light power modulator 130, the power of the light L is spatially modulated to generate the power-modulated light Lm. In one example, the light power modulator 130 may include a first portion P1 having a first transmittance, a second portion P2 having a second transmittance lower than the first transmittance, and a third portion P3 having a third transmittance lower than the second transmittance. After the light L propagates through the first portion P1, the light may be output as a power-modulated light beam Lm having a first light amount I1. After the light L propagates through the second portion P2, the light may be output as a power-modulated light beam Lm having a second light amount I2 smaller than the first light amount I1. After the light L propagates through the third portion P3, the light may be output as a power-modulated light beam Lm having a third light amount I3 smaller than the second light amount I2. The light power modulator 130 may include, for example, a spatially modulated neutral density filter. However, the present disclosure is not limited thereto.

In some embodiments, the power-modulated light Lm may scan the measurement target W along a scan direction SD parallel to an upper surface of the measurement target W. For example, the stage 100 may be movable in a horizontal direction opposite to the scan direction SD so as to move the measurement target W with respect to the first optical system 140. Thus, the power-modulated light Lm emitted from the first optical system 140 may scan the measurement target W along the scan direction SD.

In some embodiments, the light power modulator 130 may modulate the power of the light L in the scan direction SD. That is, the power of the power-modulated light Lm may change in the scan direction SD. As the power-modulated light Lm scans the measurement target W along the scan direction SD, the power of the power-modulated light Lm incident on one point (for example, a target area TA) of the measurement target W may change over time. In one example, as shown, at a first time t1, the power-modulated light beam Lm of the first light amount I1 may be incident on the target area TA of the measurement target W. Subsequently, at a second time t2 after the first time t1, the power-modulated light beam Lm of the second light amount 12 may be incident to the target area TA of the measurement target W. Then, at a third time t3 after the second time t2, the power-modulated light beam Lm of the third light amount I3 may be incident on the target area TA of the measurement target W.

In some embodiments, the light power modulator 130 may periodically modulate the power of the light L in the scan direction SD. For example, the light power of the power-modulated light Lm may be modulated in a sine wave form or a sawtooth wave form along the scan direction SD. In one example, the light power modulator 130 may further include a fourth portion P4 having the first transmittance, a fifth portion P5 having the second transmittance, and a sixth portion P6 having the third transmittance. A distance between the first portion P1 and the fourth portion P4, a distance between the second portion P2 and the fifth portion P5, and a distance between the third portion P3 and the sixth portion P6 may be the same as each other. Thus, the power-modulated light Lm may scan the measurement target W at periodic light power.

In some embodiments, the target area TA of the measurement target W and a reference area RA of the measurement target W may be scanned simultaneously. For example, the power-modulated light Lm whose light power is periodically modulated may simultaneously scan the target area TA and the reference area RA along the scan direction SD. In one example, at the first time t1, the power-modulated light beam Lm of the first light amount I1 may be simultaneously incident on the target area TA and the reference area RA. Subsequently, at the second time t2 after the first time t1, the power-modulated light beam Lm of the second light amount I2 may be simultaneously incident on the target area TA and the reference area RA. Subsequently, at the third time t3 after the second time t2, the power-modulated light beam Lm of the third light amount I3 may be simultaneously incident on the target area TA and the reference area RA.

The first optical system 140 may direct the power-modulated light Lm emitted from the light power modulator 130 toward the measurement target W, such that reflected light beams Lr1, Lr2, and Lr3 reflected from the measurement target W may be generated. In some embodiments, upon receiving the plurality of different modulated light beams (for example, the first to third modulated light beams Lm1 to Lm3) from the light power modulator 130, the first optical system 140 may obtain the plurality of different reflected light beams (for example, the first to third reflected light beams Lr1 to Lr3). For example, the first optical system 140 may obtain the first reflected light beam Lr1 obtained when the first modulated light beam Lm1 is reflected from the measurement target W, and may obtain the second modulated light beam Lr2 obtained when the second reflected light beam Lr2 is reflected from the measurement target W, and may obtain the third reflected light beam Lr3 obtained when the third modulated light beam Lm3 is reflected from the measurement target W.

In some embodiments, the first optical system 140 may include a beam splitter 142 and an objective lens 144.

The beam splitter 142 may reflect the power-modulated light Lm emitted from the light power modulator 130 so as to be directed toward the objective lens 144. Further, the beam splitter 142 receives and transmits the reflected light beams Lr1, Lr2, and Lr3 emitted from the objective lens 144 therethrough so as to be directed toward the second optical system 160.

The objective lens 144 may condense the power-modulated light Lm emitted from the beam splitter 142 and may direct the condensed power-modulated light beam Lm to the measurement target W. Further, the objective lens 144 may convert the reflected light beams Lr1, Lr2, and Lr3 reflected from the measurement target W into parallel light beams, which in turn may be incident to the beam splitter 142. The objective lens 144 may be positioned so that a focal point is formed on a surface of the measurement target W or within the measurement target W.

In some embodiments, the power-modulated light Lm may be provided as multifocal light. For example, as described above, the first to third modulated light beams Lm1 to Lm3 may have different wavelength bands. Accordingly, as shown in FIG. 3, the first to third modulated light beams Lm1 to Lm3 may have different refractive indices with respect to the objective lens 144. In one example, the objective lens 144 may have a first focal length with respect to the first light beam L1, may have a second focal length greater than the first focal length with respect to the second light beam L2, and may have a third focal length greater than the second focal length with respect to the third light beam L3.

In some embodiments, based on a surface Ws of the measurement target W, a first focal point f1 of the first light beam L1 may have a first depth D1, a second focal point f2 of the second light beam L2 may have a second depth D2 deeper than the first depth D1, and a third focal point f3 of the third light beam L3 may have a third depth D3 deeper than the second depth D2.

The second optical system 160 may provide the reflected light beams Lr1, Lr2, and Lr3 emitted from the first optical system 140 to the sensing unit 170. For example, the second optical system 160 may reflect the reflected light beams Lr1, Lr2, and Lr3 emitted from the first optical systems 140 so as to be directed toward the sensing unit 170.

In some embodiments, the second optical system 160 may separate the plurality of reflected light beams (for example, the first to third reflected light beams Lr1 to Lr3) emitted from the first optical system 140 and provide the separated reflected light beams to the sensing unit 170. For example, the second optical system 160 may include a first detector 162 to detect the first reflected light beam Lr1, a second detector 164 to detect the second reflected light beam Lr2, and a third detector 166 to detect the third reflected light beam Lr3. In one example, the third detector 166 may reflect the third reflected light beam Lr3 so as to be directed toward the sensing unit 170, and may transmit the first reflected light beam Lr1 and the second reflected light beam Lr2 therethrough. The second detector 164 may reflect the second reflected light beam Lr2 transmitted through the third detector 166 so as to be directed toward the sensing unit 170, and may transmit the first reflected light beam Lr1 therethrough. The first detector 162 may reflect the first reflected light beam Lr1 transmitted through the third detector 166 and the second detector 164 so as to be directed toward the sensing unit 170. Each of the first detector 162, the second detector 164, and the third detector 166 may include, for example, a beam splitter. However, the present disclosure is not limited thereto.

The sensing unit 170 may sense the reflected light beams Lr1, Lr2, and Lr3 emitted from the second optical system 160 to generate image signals S1, S2, and S3. The sensing unit 170 may be embodied as, for example, a CCD (Charge Coupled Device) camera or a CMOS (Complementary Metal Oxide Semiconductor) image sensor. However, the present disclosure is not limited thereto.

In some embodiments, the sensing unit 170 may generate a plurality of image signals (e.g., the first to third image Signal S1 to S3) corresponding to the plurality of reflected light beams (e.g., the first to third reflected light beams Lr1 to Lr3) separated from the second optical system 160. For example, the sensing unit 170 may include a first sensor 172, a second sensor 174, and a third sensor 176. The first sensor 172 may generate the first image signal S1 based on a sensing result of the first reflected light beam Lr1. The second sensor 174 may generate the second image signal S2 based on a sensing result of the second reflected light beam Lr2. The third sensor 176 may generate the third image signal S3 based on a sensing result of the third reflected light beam Lr3.

As described above, the light power of the power-modulated light Lm incident on one point (for example, the target area TA) of the measurement target W may vary. The sensing unit 170 may generate the image signals corresponding to the varying power. In one example, the first image signal S1 may be generated in response to the varying light power of the first modulated light beam Lm1, the second image signal S2 may be generated in response to the varying light power of the second modulated light beam Lm2, and the third image signal S3 may be generated corresponding to the varying light power of the third modulated light beam Lm3.

The processor 180 may analyze the measurement target W using the image signals S1, S2, and S3 provided from the sensing unit 170. For example, the processor 180 may detect a defect in the measurement target W.

The processor 180 may be implemented in hardware, firmware, software, or any combination thereof. For example, the processor 180 may be a computing device such as a workstation computer, a desktop computer, a laptop computer, or a tablet computer. The processor 180 may be embodied as a simple controller, a complex processor such as a micro processor, a CPU or a GPU, a processor configured in a software manner, dedicated hardware or firmware. In some embodiments, the processor 180 may provide an ADC (Automatic Defect Classification) function.

The processor 180 may separate a real signal and a false signal from each of the image signals S1, S2, and S3 provided from the sensing unit 170 using the power-modulated light Lm. For example, the processor 180 may include database 182, a noise filter 184, and a defect analyzer 186.

The database 182 may pre-store therein signal data of the measurement target W based on the light power. For example, each of the image signals S1, S2, and S3 related to the measurement target W may have a specific tendency based on the power of the light incident on the measurement target W. In one example, as shown in FIG. 4, a signal-to-noise ratio (SNR) related to the defect of the measurement target W may tend to increase as the light power increases and then saturate at a specific value (for example, Sm). The database 182 may pre-store therein such defect signal data.

The noise filter 184 may filter the image signals S1, S2, and S3 provided from the sensing unit 170 using the database 182. Specifically, each of the image signals S1, S2, and S3 provided from the sensing unit 170 may contain not only the real signal as real information about the measurement target W, but also the false signal caused due to noise or nuisance. Unlike the real signal which has a specific tendency depending on the power of the light incident on the measurement target W, the false signal may be random regardless of the power of the light incident on the measurement target W. Thus, the noise filter 184 may separate the real signal from each of the image signals S1, S2, and S3 generated based on the varying light power of the power-modulated light Lm. For example, the noise filter 184 may classify a component of dependent on the light power of the power-modulated light Lm in each of the image signals S1, S2, and S3 as the real signal. Further, the noise filter 184 may classify a component independent of the light power of the power-modulated light Lm in each of the image signals S1, S2, and S3 as the false signal.

In one example, as shown in FIG. 2, the power-modulated light Lm may scan the measurement target W at the light power varying in a periodic manner. Based on the signal data of the measurement target W pre-stored in the database 182, the noise filter 184 may classify the signal-to-noise ratio (SNR) that changes based on the varying light power of the power-modulated light Lm as the real signal. Thus, as shown in FIG. 5, a signal varying in a periodic manner based on the varying light power of the power-modulated light Lm may be classified as the real signal (RS). Further, a signal varying in an independent manner of the varying light power of the power-modulated light Lm may be classified as the false signal (FS).

In some embodiments, the processor 180 may analyze one point (e.g., the target area TA) of the measurement target W over 2 periods. In one example, as shown in FIG. 5, the processor 180 may filter out the real signal RS and the false signal FS over a first period C1 (0 to ta), and then may filter out the real signal RS and the false signal FS over a second period C2 (ta to tb) identical with the first period C1.

The defect analyzer 186 may analyze a defect of one point (for example, the target area TA) of the measurement target W using the real signal separated by the noise filter 184. The image signals S1, S2, and S3 generated based on the power-modulated light Lm may include 3D image data. In one example, as shown in each of FIG. 6A and FIG. 6B, each of the target area TA and the reference area RA may be positioned in a three-dimensional coordinate system (X, Y, and Z).

The defect analyzer 186 may detect a defect area DA of the target area TA based on a comparing result between the target area TA and the reference area RA. In one example, the target area TA may include a first point Pa, and the reference area RA may include a second point Pb corresponding thereto. That is, the first point Pa and the second point Pb may have the same coordinate (for example, (x1, y1, and z1)) in the 3D coordinate system (X, Y, and Z). The defect analyzer 186 may detect the defect area DA of the target area TA based on a comparing result between an image signal of the first point Pa and an image signal of the second point Pb.

As described above, the power-modulated light Lm may be embodied as multifocal light. Thus, the defect analyzer 186 may perform analysis in a depth direction (for example, in a Z-axis direction) of the target area TA at a high speed. For example, the defect analyzer 186 may simultaneously process the image signals (for example, S1, S2, and S3) at different depths (for example, the first depth D1, the second depth D2, and the third depth D3 in FIG. 2) of the measurement target W.

In one example, the noise filter 184 may classify a component dependent on the light power of the first modulated light beam Lm1 in the first image signal S1 as a first real signal, and may classify a component independent of the light power of the first modulated light beam Lm1 as a first false signal. Further, the noise filter 184 may classify a component dependent on the light power of the second modulated light beam Lm2 in the second image signal S2 as a second real signal, and may classify a component independent of the light power of the second modulated light beam Lm2 as a second false signal. Further, the noise filter 184 may classify a component dependent on the light power of the third modulated light beam Lm3 in the third image signal S3 as a third real signal, and may classify a component independent of the light power of the third modulated light beam Lm3 as a third false signal. The defect analyzer 186 may simultaneously perform analysis of the different depths of the measurement target W using the first real signal, the second real signal, and the third real signal.

In optical measurement to analyze the measurement target of the three-dimensional structure, the false signal resulting from the noise or nuisance caused by a lower layer may act as an obstacle to precise optical measurement. For example, in optical measurement for detecting the defect present in a lower portion of the three-dimensional semiconductor device, the false signal resulting from the noise or nuisance may obscure a depth where the defect occurs.

However, the optical measurement apparatus according to some embodiments may efficiently distinguish the real signal and the false signal from each other using the power-modulated light Lm. Specifically, as described above, the light power modulator 130 may modulate the power of the light L and output the power-modulated light Lm. The light power of the power-modulated light Lm incident on one point (for example, the target area TA) of the measurement target W may vary over time. Further, the processor 180 may classify the component varying based on the varying light power of the power-modulated light Lm in each of the image signals S1, S2, and S3 as the real signal, and then may analyze the measurement target W using the classified real signal. Thus, the optical measurement apparatus capable of performing precise and fast analysis of the semiconductor device having the three-dimensional structure may be implemented.

Figure 7:
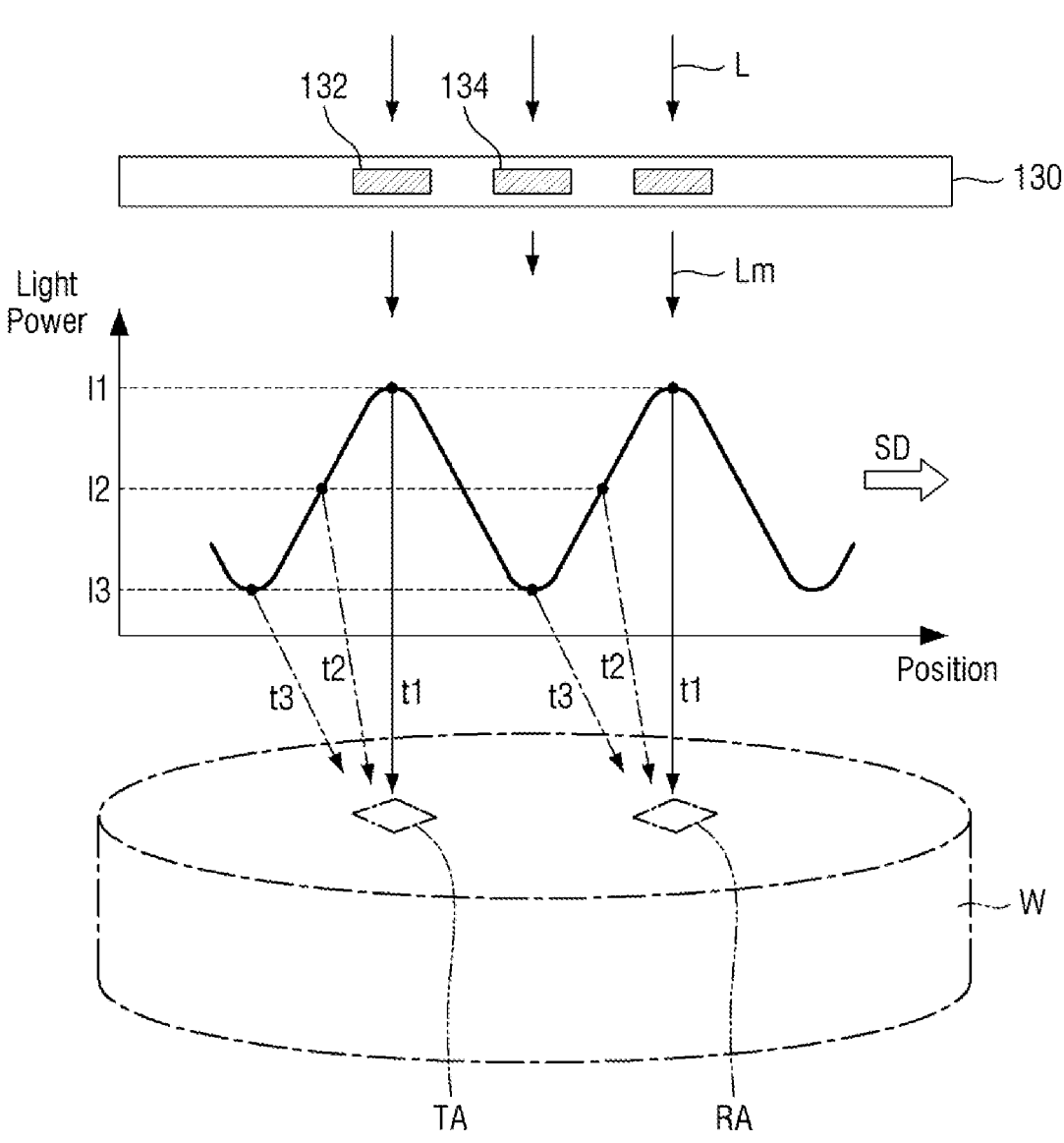
FIG. 7 is a conceptual diagram for illustrating light power modulation of an optical measurement apparatus according to some embodiments.

FIG. 7 is a conceptual diagram for illustrating light power modulation of an optical measurement apparatus according to some embodiments. For convenience of description, the descriptions duplicate with those as set forth above with reference to FIG. 1 to FIG. 6 are briefly set forth or omitted.

Referring to FIG. 1 and FIG. 7, in the optical measurement apparatus according to some embodiments, the light power modulator 130 may perform spatial modulation on the power of the light L using an electro-optic modulator (an EO modulator) or an acousto-optic modulator (an AO modulator).

For example, the light power modulator 130 may include first modulation means 132 and second modulation means 134 at different positions. The first modulation means 132 and the second modulation means 134 may modulate the power of the light L at different magnitudes. In one example, when the light power modulator 130 includes the electro-optic modulator, each of the first modulation means 132 and the second modulation means 134 may be embodied as an electrode. In another example, when the light power modulator 130 includes the acousto-optic modulator, each of the first modulation means 132 and the second modulation means 134 may be embodied as a piezoelectric transducer.

Figure 8:
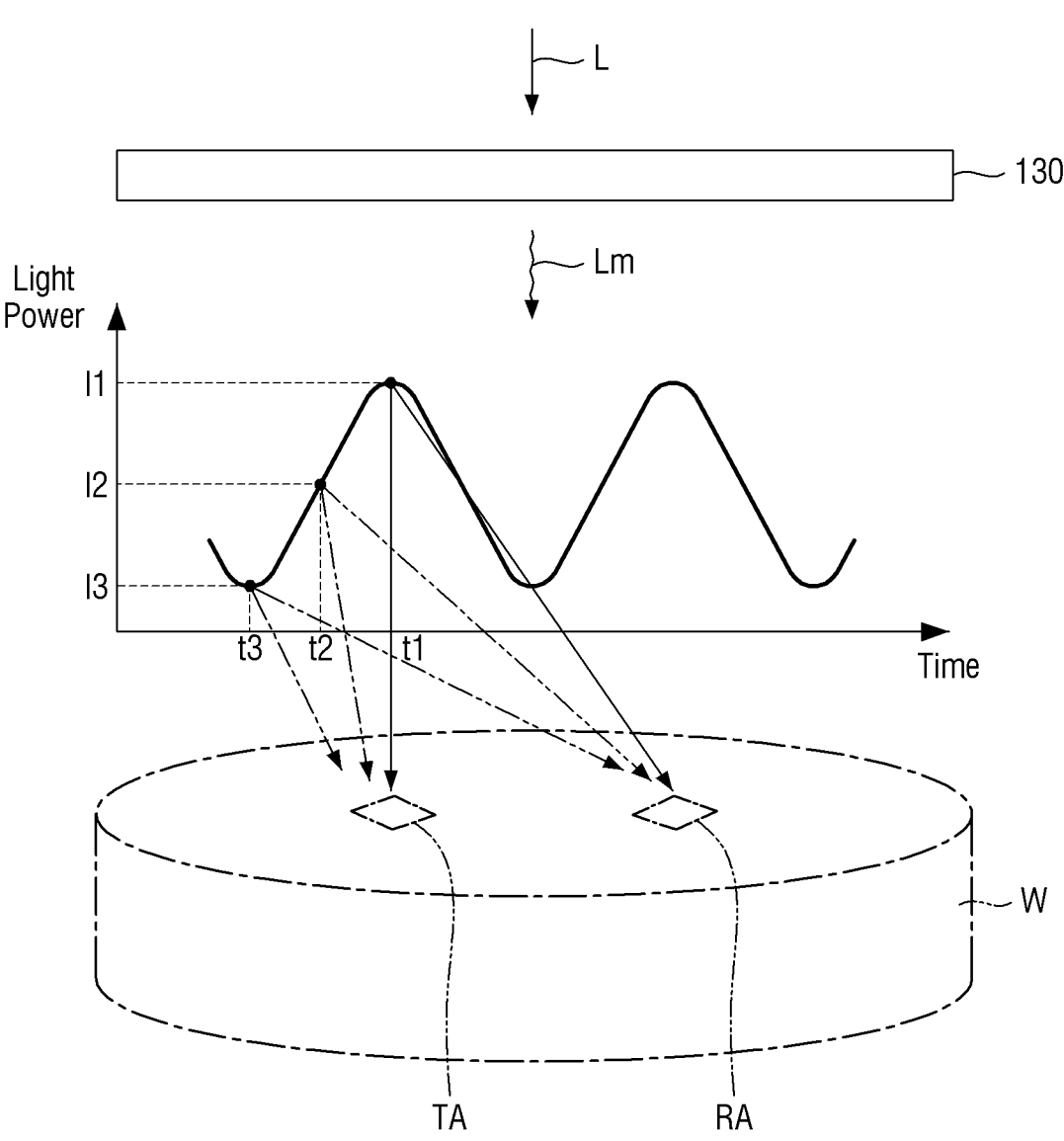
FIG. 8 is a conceptual diagram for illustrating light power modulation of an optical measurement apparatus according to some embodiments.

FIG. 8 is a conceptual diagram for illustrating light power modulation of an optical measurement apparatus according to some embodiments. For convenience of description, the descriptions duplicate with those as set forth above with reference to FIG. 1 to FIG. 7 are briefly set forth or omitted.

Referring to FIGS. 1 and 8, in the optical measurement apparatus according to some embodiments, the light power modulator 130 may perform temporal modulation on the power of the light L.

That is, the light power modulator 130 may temporally modulate the power of the light L to generate the power-modulated light Lm. Thus, the light power of the power-modulated light Lm incident on one point (for example, the target area TA) of the measurement target W may vary over time. In one example, at the first time t1, the power-modulated light beam Lm of the first light amount I1 may be incident on the target area TA of the measurement target W. Subsequently, at the second time t2 after the first time t1, the power-modulated light beam Lm of the second light amount I2 may be incident to the target area TA of the measurement target W. Then, at the third time t3 after the second time t2, the power-modulated light beam Lm of the third light amount I3 may be incident on the target area TA of the measurement target W.

In some embodiments, the light power modulator 130 may generate a periodic power-modulated light beam Lm. For example, the power-modulated light Lm may be modulated in a sine wave form or a sawtooth wave form.

In some embodiments, the target area TA of the measurement target W and the reference area RA of the measurement target W may be scanned simultaneously. For example, the periodic power-modulated light beam Lm may simultaneously scan the target area TA and the reference area RA along the scan direction SD. In one example, at the first time t1, the power-modulated light beam Lm of the first light amount I1 may be simultaneously incident on the target area TA and the reference area RA. Subsequently, at the second time t2 after the first time t1, the power-modulated light beam Lm of the second light amount I2 may be simultaneously incident on the target area TA and the reference area RA. Subsequently, at the third time t3 after the second time t2, the power-modulated light beam Lm of the third light amount I3 may be simultaneously incident on the target area TA and the reference area RA.

Figure 9:
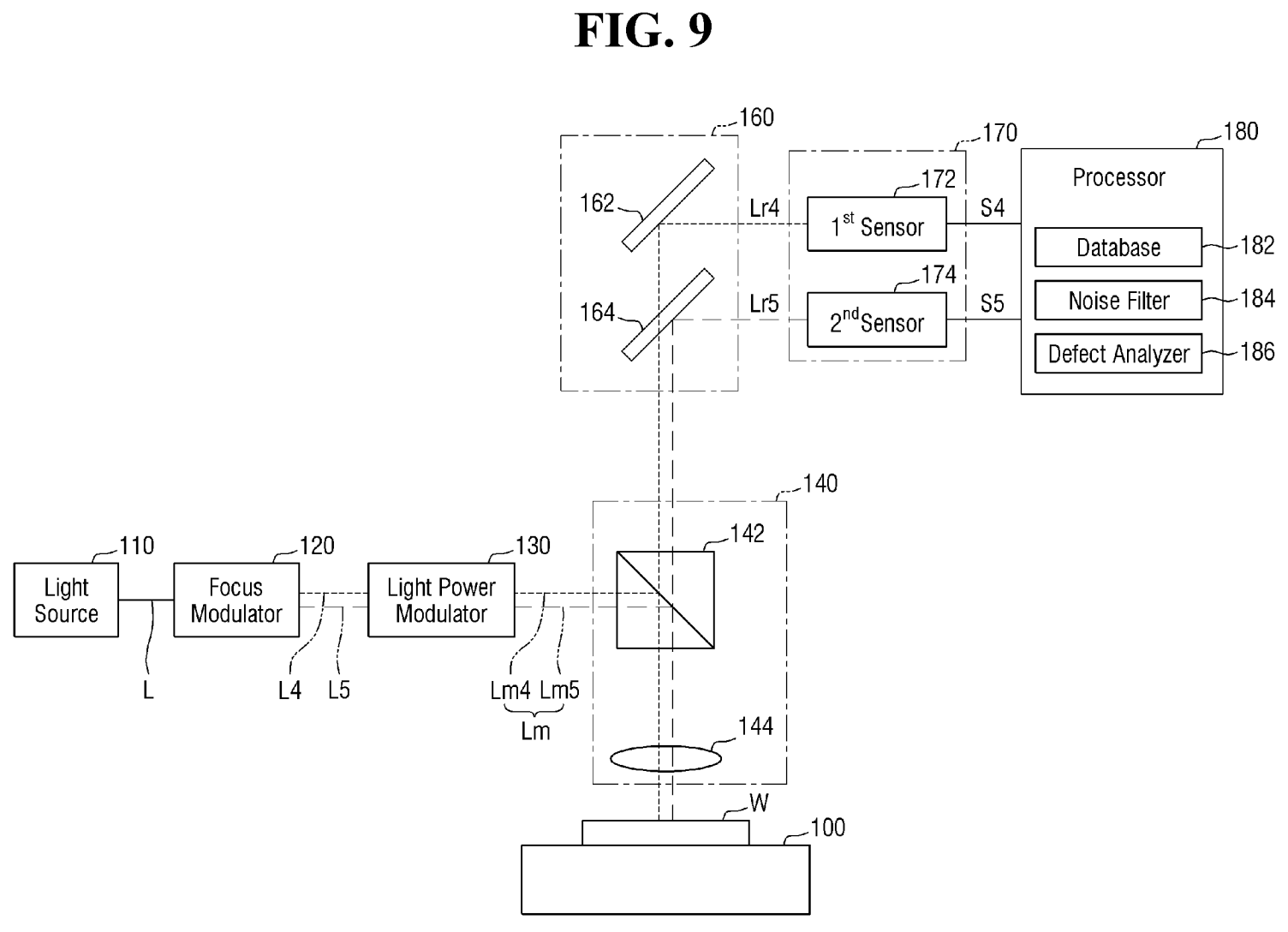
Figure 10:
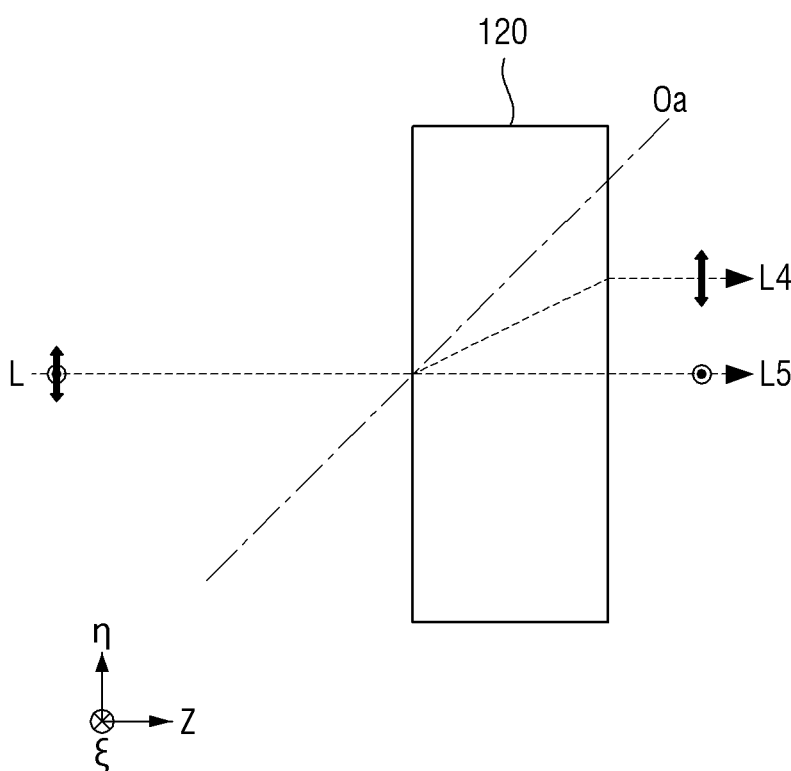
FIG. 10 is a conceptual diagram for illustrating focus modulation of the optical measurement apparatus of FIG. 9.

FIG. 9 is an illustrative conceptual diagram for illustrating an optical measurement apparatus according to some embodiments. FIG. 10 is a conceptual diagram for illustrating focus modulation of the optical measurement apparatus of FIG. 9. For convenience of description, the descriptions duplicate with those as set forth above with reference to FIG. 1 to FIG. 8 are briefly set forth or omitted.

Referring to FIG. 9 and FIG. 10, the optical measurement apparatus according to some embodiments may further include a focus modulator 120.

The focus modulator 120 may receive and modulate the light L emitted from the light source 110 and may output multifocal light. For example, the focus modulator 120 may modulate the light L emitted from the light source 110 to output a fourth light beam LA and a fifth light beam L5 having different refractive indices with respect to the objective lens 144.

The light power modulator 130 may modulate the power of the fourth light beam L4 to output a fourth modulated light beam Lm4, and may modulate the power of the fifth light beam L5 to output a fifth modulated light beam Lm5. The first optical system 140 may obtain a fourth reflected light beam Lr4 obtained when the fourth modulated light beam Lm4 is reflected from the measurement target W, and may obtain a fifth modulated light beam Lm5 obtained when the fifth reflected light beam Lr5 is reflected from the measurement target W. The first sensor 172 may generate a fourth image signal S4 based on a sensing result of the fourth reflected light beam Lr4. The second sensor 174 may generate a fifth image signal S5 based on a sensing result of the fifth reflected light beam Lr5. The processor 180 may separate the real signal and the false signal from each of the image signals S4 and S5 provided from the sensing unit 170 using each of the fourth modulated light beam Lm4 and the fifth modulated light beam Lm5.

In some embodiments, the focus modulator 120 may include a beam displacer. The beam displacer may include a material (for example, calcite) having birefringence to generate the fourth light beam L4 and the fifth light beam L5 into which the light L is divided.

For example, the light L may include a horizontal component beam and a vertical component beam. The horizontal component beam is a polarized component (that is, a p-polarized component) of the light L that vibrates in a direction (for example, a p-polarization direction n) parallel to an incident surface of the light L, and the vertical component beam is a polarized component (that is, an s-polarized component) of the light L vibrating in a direction (for example, an s-polarization direction ξ) perpendicular to the incident surface of the light L. The horizontal component beam and the vertical component beam may have different refractive indices with respect to the beam displacer.

In one example, an optical axis OA of the beam displacer may be positioned in a plane (a n-Z plane) including a traveling direction Z of the light L and the p-polarization direction n. In this case, the horizontal component beam may be an extraordinary wave, while the vertical component beam may be an ordinary wave. In one example, the light L may be incident in a perpendicular manner toward the beam displacer. At this time, the horizontal component beam may be refracted at the optical axis OA, and the vertical component beam may not be refracted thereat. That is, the horizontal component beam may be shifted in the p-polarization direction n, and the vertical component beam may not be shifted in the p-polarization direction n. Thus, the focus modulator 120 including the beam displacer may split the light L into the fourth light beam L4 as the horizontal component beam and the fifth light beam L5 as the vertical component beam.

FIG. 11 is an illustrative conceptual diagram for illustrating an optical measurement apparatus according to some embodiments. For convenience of description, the descriptions duplicate with those as set forth above with reference to FIG. 1 to FIG. 10 are briefly set forth or omitted.

Referring to FIG. 11, in the optical measurement apparatus according to some embodiments, the light power modulator 130 may be interposed between the light source 110 and the focus modulator 120.

For example, the light power modulator 130 may modulate the power of the light L emitted from the light source 110 to output the power-modulated light Lm. The focus modulator 120 may modulate the power-modulated light Lm emitted from the light power modulator 130 to output the fourth modulated light beam Lm4 and the fifth modulated light beam Lm5 having different refractive indices with respect to the objective lens 144.

Figure 12:
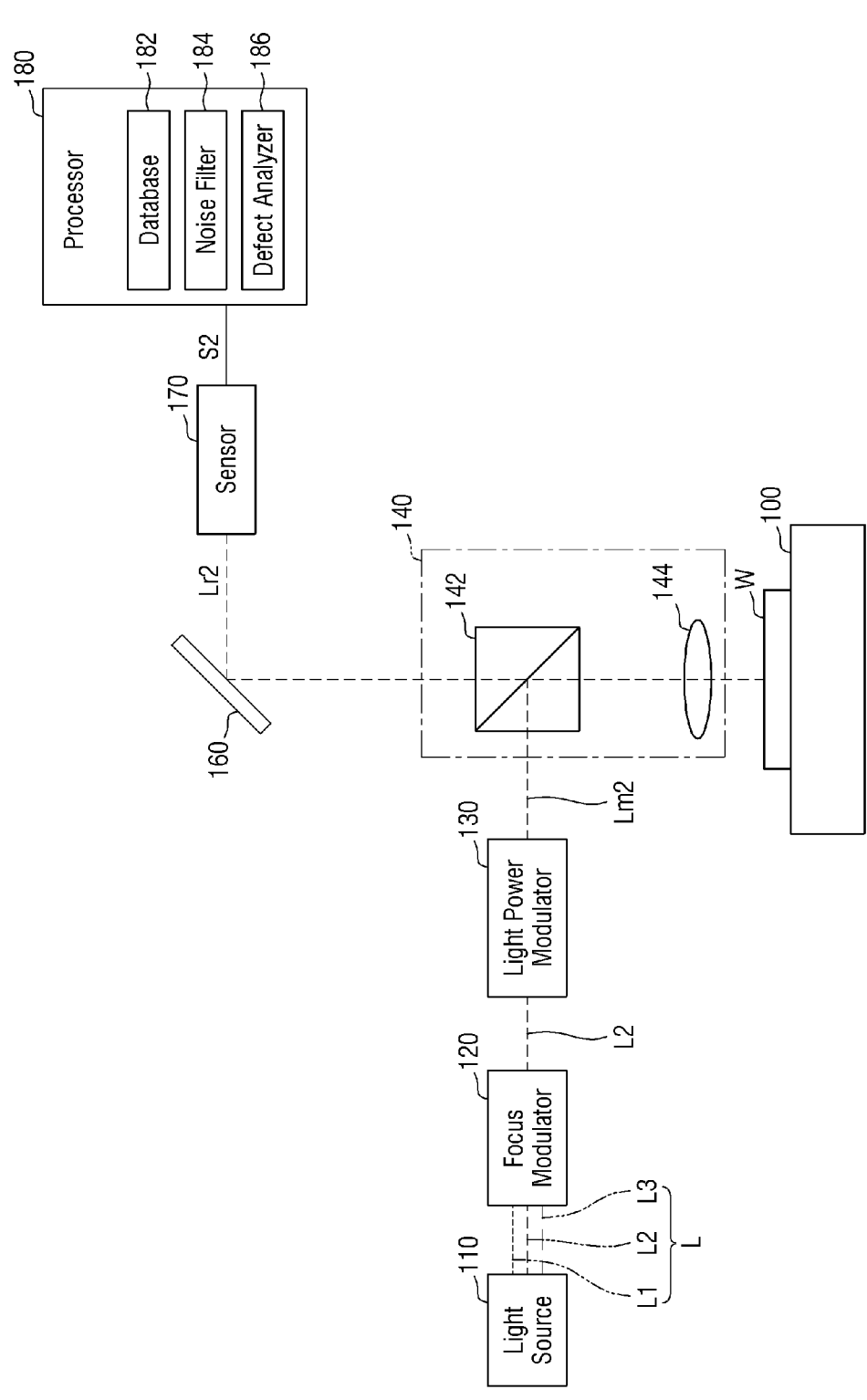
FIG. 12 is an illustrative conceptual diagram for illustrating an optical measurement apparatus according to some embodiments.
Figure 13:
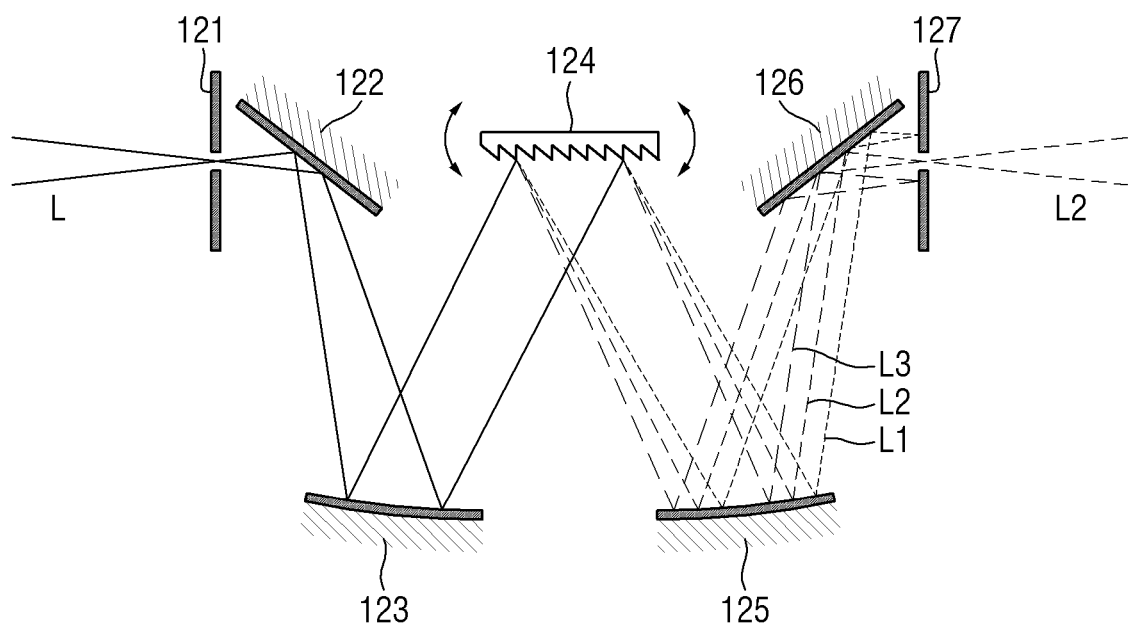
FIG. 13 is a conceptual diagram for illustrating focus modulation of the optical measurement apparatus of FIG. 12.

FIG. 12 is an illustrative conceptual diagram for illustrating an optical measurement apparatus according to some embodiments. FIG. 13 is a conceptual diagram for illustrating focus modulation of the optical measurement apparatus of FIG. 12. For convenience of description, the descriptions duplicate with those as set forth above with reference to FIG. 1 to FIG. 11 are briefly set forth or omitted.

Referring to FIG. 12 and FIG. 13, in the optical measurement apparatus according to some embodiments, the focus modulator 120 may include a monochromator.

The monochromator may convert broadband light L emitted from the light source 110 into monochromatic light and output the monochromatic light. In this regard, the monochromatic light may refer to light having a very short wavelength width (for example, light having a wavelength width of several nm). For example, as shown in FIG. 13, the focus modulator 120 may include an inlet slit 121, imaging mirrors 122, 123, 125, and 126, a diffractive grating 124, and an outlet slit 127.

The light L emitted from the light source 110 may be incident to the focus modulator 120 through the inlet slit 121. The imaging mirrors 122, 123, 125, and 126 may reflect the light L spreading from the inlet slit 121 and then emit the light through the outlet slit 127. The number and configuration of the imaging mirrors 122, 123, 125, and 126 are merely illustrative. However, the present disclosure is not limited to what is shown. The diffractive grating 124 is in a middle of an optical path from the inlet slit 121 to the outlet slit 127 so as to split the light L based on a wavelength. In one example, the light L may be split into a first light beam L1, a second light beam L2, and a third light beam L3. The diffractive grating 124 may be, for example, a reflective diffractive grating. However, the present disclosure is not limited thereto. The outlet slit 127 may selectively emit therethrough light having a predetermined wavelength band among from the first light beam L1, the second light beam L2, and the third light beam L3. In one example, the outlet slit 127 may selectively emit the third light beam L3 therethrough.

In some embodiments, the focus modulator 120 may output a plurality of monochromatic light beams while sweeping by a predetermined wavelength width in a predetermined wavelength band. For example, a rotating diffractive grating 124 may sweep the light L by a predetermined wavelength width. The monochromatic light beams sweeping by the predetermined wavelength width may have different refractive indexes with respect to the objective lens 144. Thus, the processor 180 may process the image signals (e.g., S1, S2, and S3) at different depths (e.g., the first depth D1, the second depth D2, and the third depth D3 of FIG. 2) of the measurement target W.

Figure 14:
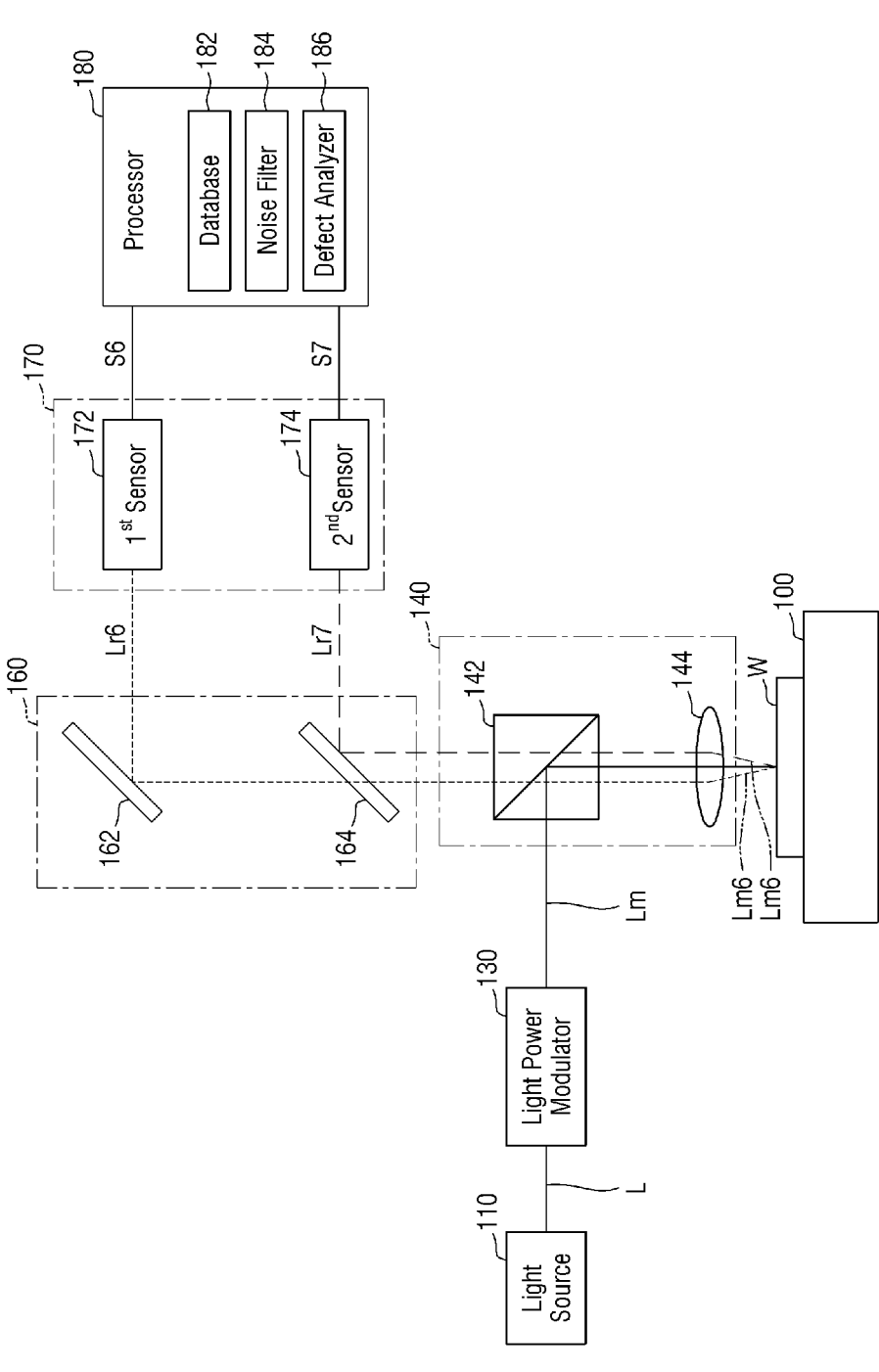
FIG. 14 is an illustrative conceptual diagram for illustrating an optical measurement apparatus according to some embodiments.
Figure 15:
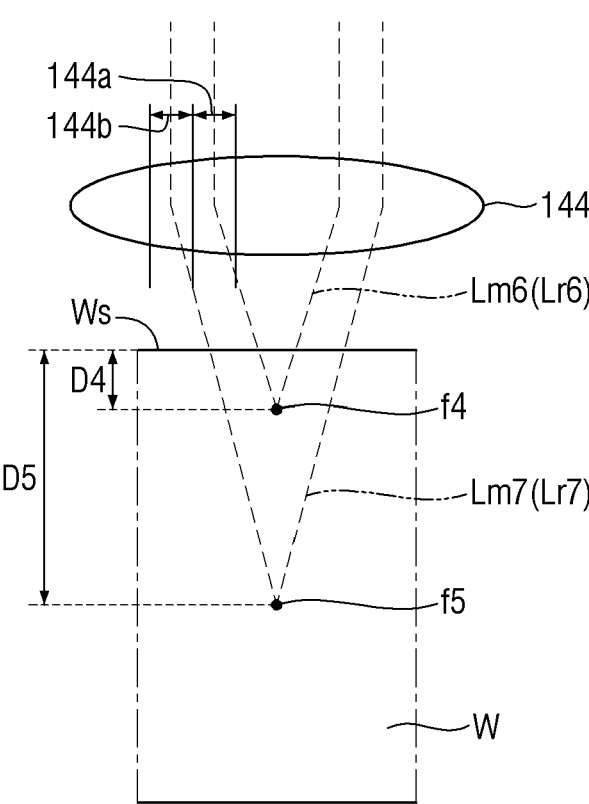
FIG. 15 is a conceptual diagram for illustrating focus modulation of the optical measurement apparatus of FIG. 14.

FIG. 14 is an illustrative conceptual diagram for illustrating an optical measurement apparatus according to some embodiments. FIG. 15 is a conceptual diagram for illustrating focus modulation of the optical measurement apparatus of FIG. 14. For convenience of description, the descriptions duplicate with those as set forth above with reference to FIG. 1 to FIG. 13 are briefly set forth or omitted.

Referring to FIG. 14 and FIG. 15, in the optical measurement apparatus according to some embodiments, the objective lens 144 may include a multifocal lens.

For example, the objective lens 144 may include a first area 144a and a second area 144b having different refractive indices. In one example, the refractive index of the first area 144a may be greater than the refractive index of the second area 144b. Thus, the power-modulated light Lm may be provided as multifocal light. In one example, the power-modulated light Lm may propagate through the first area 144a, and then may be emitted as a sixth modulated light beam Lm6 having a fourth focal point f4. The power-modulated light beam Lm may propagate through the second area 144b and then may be emitted as a seventh modulated light beam Lm7 having a fifth focal point f5.

In some embodiments, based on the surface Ws of the measurement target W, the fourth focal point f4 of the sixth modulated light beam Lm6 may have a fourth depth D4, and the fifth focal point f5 of the seventh modulated light beam Lm7 may have a fifth depth D5 deeper than the fourth depth D4.

The first optical systems 140 may obtain a sixth reflected light beam Lr6 obtained when the sixth modulated light beam Lm6 is reflected from the measurement target W, and may obtain a seventh reflected light beam Lr7 obtained when the seventh modulated light beam Lm7 is reflected from the measurement target W. The first sensor 172 may generate a sixth image signal S6 based on a sensing result of the sixth reflected light beam Lr6. The second sensor 174 may generate a seventh image signal S7 based on a sensing result of the seventh reflected light beam Lr7. The processor 180 may filter out the real signal and the false signal from each of the image signals S6 and S7 provided from the sensing unit 170 using each of the sixth modulated light beam Lm6 and the seventh modulated light beam Lm7.

Hereinafter, with reference to FIG. 1 to FIG. 18, an optical measurement method according to some embodiments is described.

Figure 16:
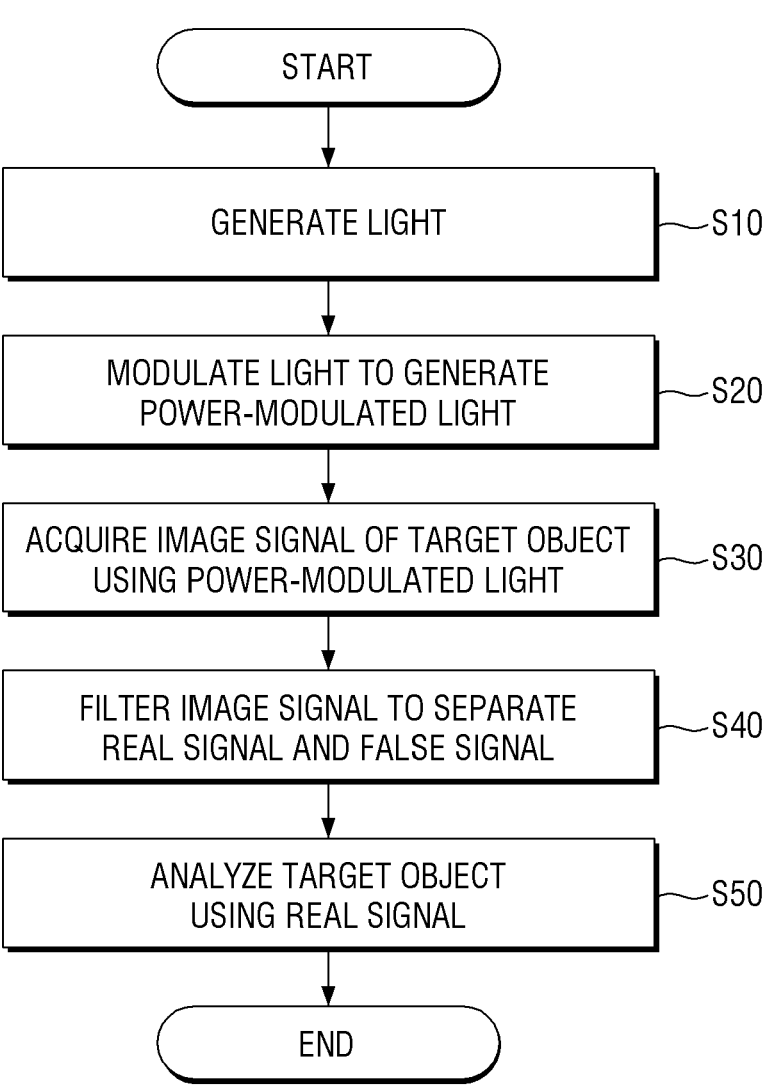
FIG. 16 is a flowchart for illustrating an optical measurement method according to some embodiments.

FIG. 16 is a flowchart for illustrating an optical measurement method according to some embodiments. For convenience of description, the descriptions duplicate with those as set forth above with reference to FIG. 1 to FIG. 15 are briefly set forth or omitted. Referring to FIG. 16, first, light is generated in S10.

The light may be, for example, broadband or multi-wavelength light. Generating the light may be performed, for example, by the light source 110 as described above with reference to FIG. 1 to FIG. 15.

Subsequently, the power of the light may be modulated such that the power-modulated light beam may be generated in S20. The power-modulated light beam may be generated by modulating the power of the light. In some embodiments, the power-modulated light beam may be generated via the spatial modulation of the light. In some embodiments, the power-modulated light beam may be generated via the temporal modulation of the light. Generating the power-modulated light beam may be performed, for example, by the light power modulator 130 as described above with reference to FIG. 1 to FIG. 15.

Subsequently, the image signal of the measurement target is acquired using the power-modulated light beam in S30.

For example, the power-modulated light beam is incident on the measurement target, and the reflected light beam reflected from the measurement target may be sensed. As the power-modulated light beam is incident on the measurement target, the light power of the power-modulated light beam incident on one point (for example, the target area) of the measurement target may vary over time. The acquisition of the image signal may be performed, for example, by the first optical system 140, the second optical system 160, and the sensing unit 170 as described above with reference to FIGS. 1 to 15.

Subsequently, the image signal is filtered to separate the real signal and the false signal therefrom in S40.

For example, the component dependent on the light power of the power-modulated light beam in the image signal may be classified as the real signal. The component independent of the light power of the power-modulated light beam in the image signal may be classified as the false signal. Filtering the image signal may be performed, for example, by the database 182 and the noise filter 184 as described above with reference to FIG. 1 to FIG. 15.

Subsequently, the measurement target is analyzed using the real signal in S50.

For example, the defect of one point of the measurement target may be analyzed based on the 3D image data using the real signal. Analyzing the defect in the measurement target may be performed, for example, by the defect analyzer 186 as described above with reference to FIG. 1 to FIG. 15.

Figure 17:
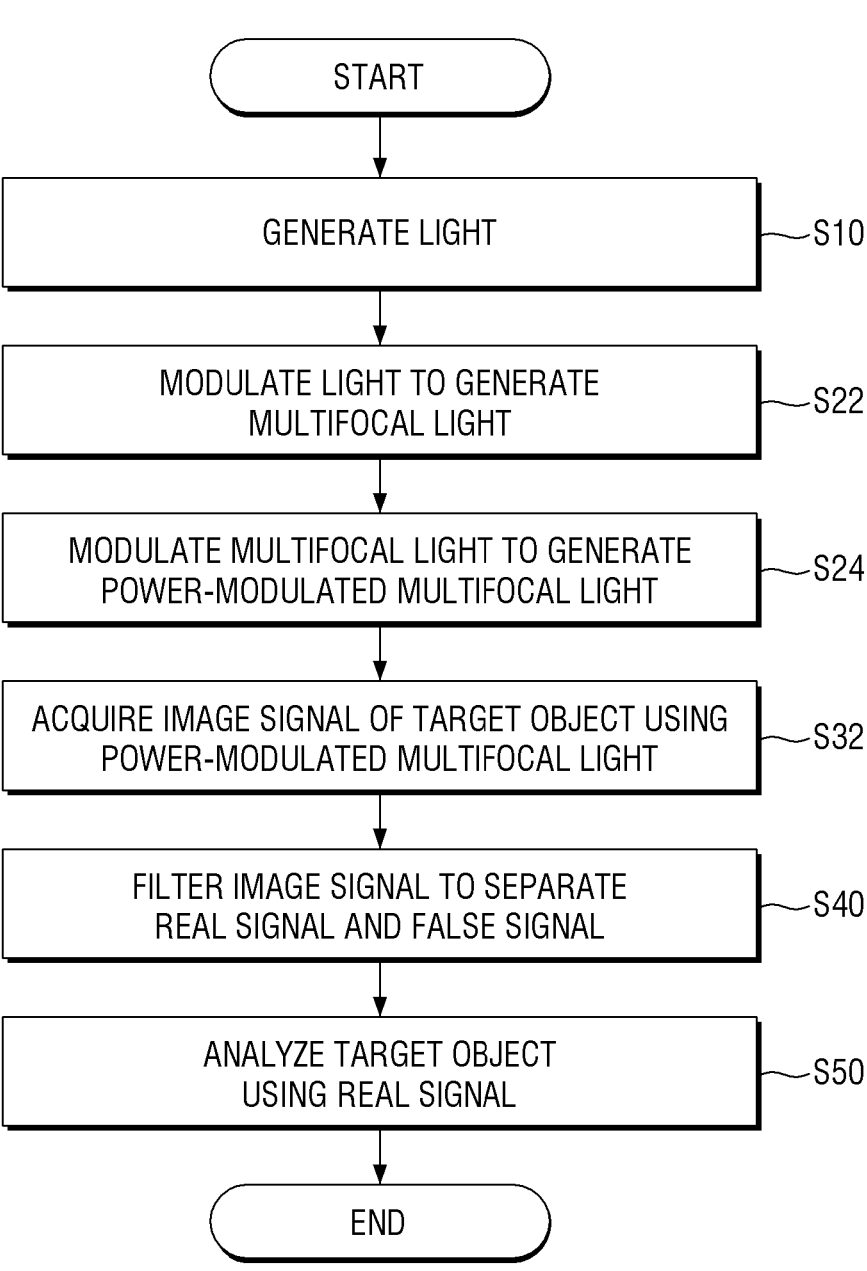
FIG. 17 is a flowchart for illustrating an optical measurement method according to some embodiments.

FIG. 17 is a flowchart for illustrating an optical measurement method according to some embodiments. For convenience of description, the descriptions duplicate with those as set forth above with reference to FIG. 1 to FIG. 16 are briefly set forth or omitted.

Referring to FIG. 17, the optical measurement method according to some embodiments generate the light in S10 and then modulates the light to generate multi-focal light in S22.

For example, the multi-focal light may be generated from the light using a beam displacer or the like. Generating the multi-focal light may be performed, for example, by the focus modulator 120 as described above with reference to FIGS. 9 and 10.

Subsequently, power of the multi-focal light may be modulated to generate power-modulated multi-focal light in S24.

Generating the power-modulated multi-focal light may be performed, for example, by the light power modulator 130 as described above with reference to FIGS. 9 and 10. Generating the power-modulated multi-focal light may be similar to step S20 as described above with reference to FIG. 16. Thus, a detailed description thereof is omitted below.

Subsequently, the image signal of the measurement target is obtained using the power-modulated multi-focal light in S32.

The acquisition of the image signal may be performed by, for example, the first optical system 140, the second optical system 160, and the sensing unit 170 as described above with reference to FIGS. 1 to 15. Since generating the image signal is similar to step S30 as described above with reference to FIG. 16, a detailed description thereof is omitted below.

Subsequently, steps S40 and S50 as described above with reference to FIG. 16 may be performed.

Figure 18:
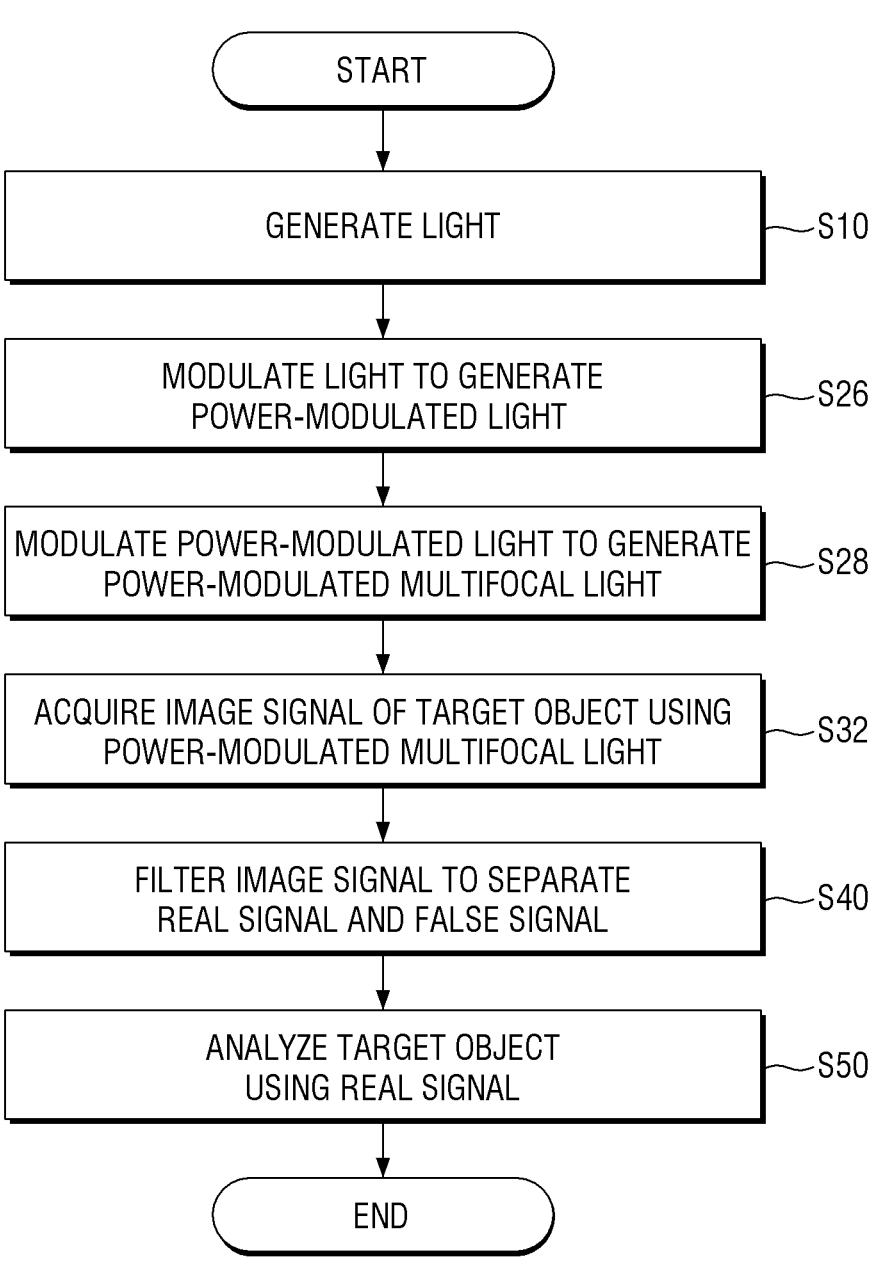
FIG. 18 is a flowchart for illustrating an optical measurement method according to some embodiments.

FIG. 18 is a flowchart for illustrating an optical measurement method according to some embodiments. For convenience of description, the descriptions duplicate with those as set forth above with reference to FIG. 1 to FIG. 17 are briefly set forth or omitted.

Referring to FIG. 18, the optical measurement method according to some embodiments generates the light in S10 and then modulates the power of the light to generate the power-modulated light beam in S26.

Generating the power-modulated light may be performed, for example, by the light power modulator 130 as described above with reference to FIG. 1 and FIG. 15. Since generating the power-modulated light beam is similar to step S20 as described above with reference to FIG. 16, a detailed description thereof is omitted below.

Subsequently, the power-modulated light is modulated to generate power-modulated multi-focal light in S28.

Generating the power-modulated multi-focal light may be performed, for example, by the focus modulator 120 as described above with reference to FIG. 11. Generating the power-modulated multi-focal light is similar to step S22 as described above with reference to FIG. 17. Thus, a detailed description thereof is omitted below.

Subsequently, steps S32, S40, and S50 as described above with reference to FIG. 17 may be performed.

Figure 19:
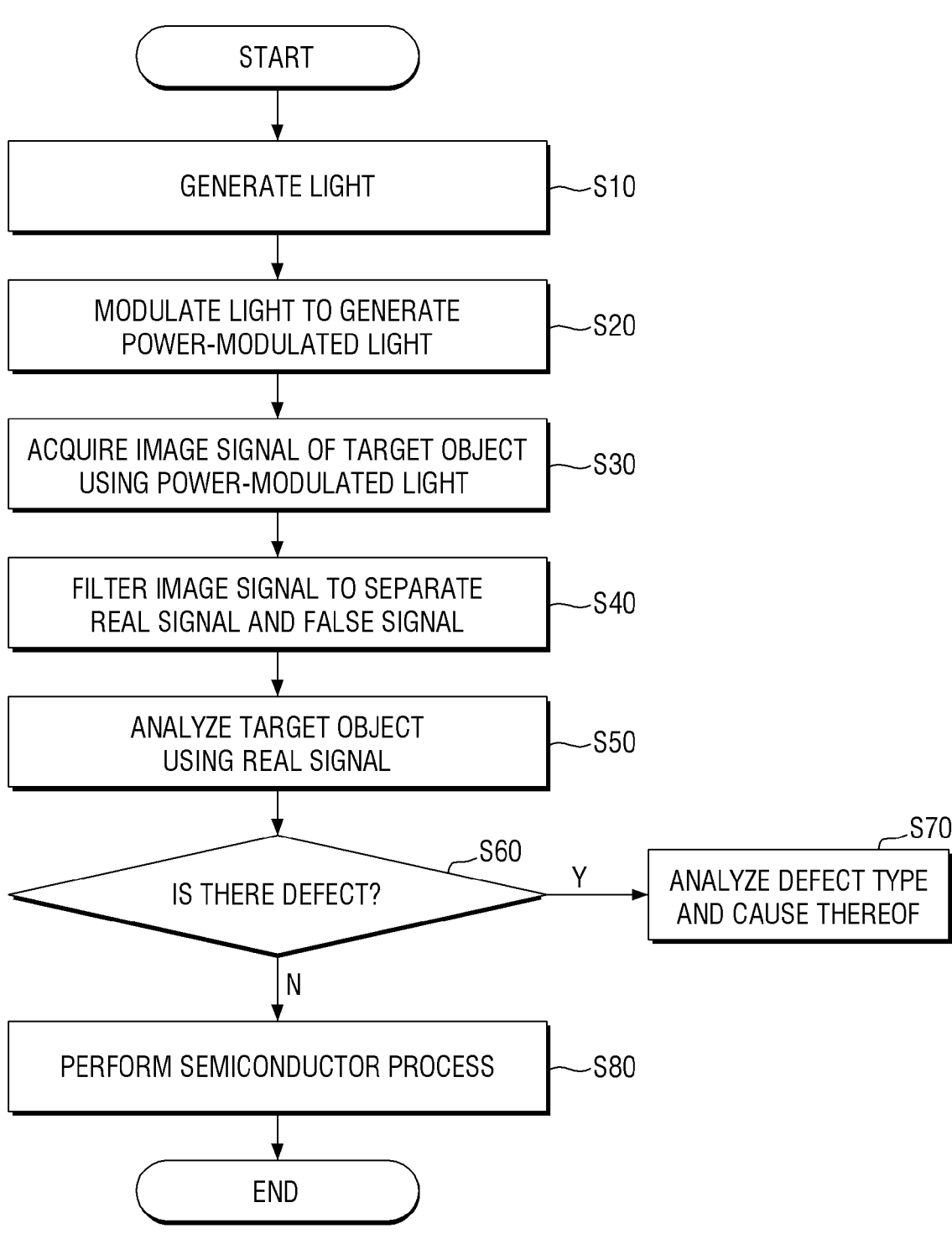
FIG. 19 is a flowchart for illustrating a method for manufacturing a semiconductor device according to some embodiments.

FIG. 19 is a flowchart for illustrating a method for manufacturing a semiconductor device according to some embodiments.

Hereinafter, referring to FIG. 1 to FIG. 19, the method for manufacturing a semiconductor device according to some embodiments is described.

FIG. 19 is a flowchart for illustrating a method for manufacturing a semiconductor device according to some embodiments. For convenience of description, the descriptions duplicate with those as set forth above with reference to FIG. 1 to FIG. 18 are briefly set forth or omitted.

Referring to FIG. 19, first, the method includes generating the light in S10, modulating the light to generate the power-modulated light in S20, obtaining the image signal of the measurement target using the power-modulated light in S30, filtering the image signal to separate the real signal and the false signal therefrom in S40, and analyzing the measurement target based on the real signal in S50. Since steps S10 to S50 are substantially the same as those as described above with reference to FIG. 16 to FIG. 18, detailed descriptions thereof are omitted below.

Subsequently, it is determined whether there is a defect in the measurement target in S60. Whether the defect is present in the measurement target, for example, a wafer, may be determined based on a measuring result of the measurement target. For example, based on the result of measuring the measurement target using the optical measurement method as described above with reference to FIG. 16 to FIG. 18, it may be determined whether there are fine particles or scratches on the measurement target.

When it is determined that the defect is present in the measurement target in (Y in S60), a type of the defect and a cause thereof are analyzed in S70. In some embodiments, a step of removing the defect using a cleaning process or the like may be performed based on to the type of the defect. Alternatively, in some embodiments, a step of discarding the measurement target may be performed based on the type of the defect.

When it is determined that there is no defect in the measurement target (N in S60), a semiconductor device manufacturing process is performed on the measurement target in S80. For example, when the measurement target is the wafer, the semiconductor device manufacturing process may be performed on the wafer. The semiconductor device manufacturing process on the wafer may include, for example, a deposition process, an etching process, an ion process, and a cleaning process. However, the present disclosure is not limited thereto. As the semiconductor device manufacturing process on the wafer is performed, integrated circuits and wiring required for a semiconductor device may be formed. The semiconductor device manufacturing process on the wafer may include a test process on a wafer-level semiconductor device.

When semiconductor chips are produced in the wafer via the semiconductor device manufacturing process on the wafer, the wafer may be individualized into individual semiconductor chips. The individualization of the water into the individual semiconductor chips may be achieved via a sawing process using a blade or laser. Subsequently, a packaging process on each of the semiconductor chips may be performed. The packaging process may mean a process of mounting each of the semiconductor chips on a circuit board (for example, a printed circuit board (PCB)) and sealing the semiconductor chip with a sealing material. Further, the packaging process may include forming a stack package by stacking a plurality of semiconductor chips in multiple layers on the circuit board, or forming a POP (Package On Package) structure by stacking stack packages on top of each other. A semiconductor package may be formed through a packaging process on each semiconductor chip. The semiconductor device manufacturing process on the package may include a test process on a package-level semiconductor device.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

In concluding the detailed description, those skilled in the art will appreciate that many variations and modifications may be made to the preferred embodiments without substantially departing from the principles of the present inventive concept. Therefore, the disclosed preferred embodiments of the disclosure are used in a generic and descriptive sense only and not for purposes of limitation.

What is claimed is:

1. A method for manufacturing a semiconductor device, the method comprising:
generating light including a first light beam and a second light beam different from each other;
modulating power of the light to generate power-modulated light including a first power-modulated light beam in which the power of the first light beam is modulated and a second power-modulated light beam in which the power of the second light beam is modulated;
acquiring an image signal of a measurement target using the power-modulated light,
wherein the first power-modulated light beam and the second power-modulated light beam are incident on the measurement target at different focal lengths;
filtering the image signal to separate a real signal and a false signal;
analyzing the measurement target using the real signal; and
performing a semiconductor process on the measurement target based on a result of analyzing the measurement target using the real signal;
wherein filtering the image signal includes classifying a first component of the image signal that is dependent on power of the power-modulated light as the real signal, and classifying a second component of the image signal that is independent of the power of the power-modulated light as the false signal.

2. The method of claim 1, wherein generating the power-modulated light includes spatially modulating the power of the light,
wherein acquiring the image signal includes scanning the measurement target along a scan direction parallel to an upper surface of the measurement target using the power-modulated light.

3. The method of claim 1, wherein analyzing the measurement target includes detecting a defect in the measurement target.

4. The method of claim 1, wherein the semiconductor process includes at least one of a deposition process, an etching process, an ion process, a cleaning process, or a test process.

5. The method of claim 1, wherein the measurement target comprises a target area and a reference area.

6. The method of claim 5, wherein the first light beam and the second light beam have different wavelength bands.

7. An optical measurement apparatus comprising:
a light source configured to generate light;
a light power modulator configured to modulate power of the light to generate power-modulated light;
a first optical system configured to direct the power-modulated light toward a measurement target, and configured to output reflected light obtained when the power-modulated light is reflected from the measurement target;
a sensor configured to sense the reflected light and to generate an image signal; and
a processor configured to classify a component of the image signal that is dependent on light power of the power-modulated light as a real signal, and to analyze the measurement target based on the real signal,
wherein the light includes a first light beam and a second light beam different from each other,
wherein the power-modulated light includes a first power-modulated light beam in which the power of the first light beam is modulated, and a second power-modulated light beam in which the power of the second light beam is modulated, and
wherein the first optical system directs the first power-modulated light beam incident on the measurement target at a first focal length, and directs the second power-modulated light beam incident on the measurement target at a second focal length different from the first focal length.

8. The optical measurement apparatus of claim 7, wherein the light power modulator is configured to spatially modulate the power of the light to generate the power-modulated light,
wherein the power-modulated light is configured to scan the measurement target along a scan direction parallel to an upper surface of the measurement target.

9. The optical measurement apparatus of claim 7, wherein the light power modulator is configured to temporally modulate the power of the light to generate the power-modulated light.

10. The optical measurement apparatus of claim 7, further comprising a focus modulator configured to modulate the light to generate the first light beam incident on the measurement target at the first focal length and the second light beam incident on the measurement target at the second focal length different from the first focal length.

11. The optical measurement apparatus of claim 7, wherein the processor includes a database configured to store therein defect signal data about the measurement target based on light power, a noise filter configured to separate the real signal from the image signal using the database, and a defect analyzer configured to analyze a defect in the measurement target using the real signal.

12. The optical measurement apparatus of claim 7, wherein the measurement target comprises a target area and a reference area.

13. The optical measurement apparatus of claim 12, wherein the first light beam and the second light beam have different wavelength bands.

14. The optical measurement apparatus of claim 7, further comprising a second optical system configured to reflect the reflected light output from the first optical system and provide the reflected light to the sensor.

15. The optical measurement apparatus of claim 14, wherein the second optical system includes a beam splitter.

16. An optical measurement apparatus comprising:
a stage having a measurement target thereon;
a light source for generating and outputting light including first and second light beams having different wavelength bands;
a light power modulator for modulating power of the first light beam to generate a first power-modulated light beam and for modulating power of the second light beam to generate a second power-modulated light beam;

a first optical system configured to direct the first power-modulated light beam incident on the measurement target at a first focal length, and to direct the second power-modulated light beam incident on the measurement target at a second focal length different from the first focal length;

a second optical system including a first reflector configured to reflect a first reflected light beam obtained when the first power-modulated light beam is reflected from the measurement target, and a second reflector configured to reflect a second reflected light beam obtained when the second power-modulated light beam is reflected from the measurement target;

a sensing unit including a first sensor configured to sense the first reflected light beam from the first reflector and configured to generate a first image signal based on a sensing result, and a second sensor configured to sense the second reflected light beam from the second reflector and configured to generate a second image signal based on a sensing result; and a processor configured to analyze the measurement target using the first image signal and the second image signal.

17. The optical measurement apparatus of claim 16, wherein the processor is configured to classify a first component of the first image signal that is dependent on light power of the first power-modulated light beam as a first real signal, to analyze the measurement target at a first depth using the first real signal, to classify a second component of the second image signal that is dependent on light power of the second power-modulated light beam as a second real signal, and to analyze the measurement target at a second depth different from the first depth using the second real signal.

18. The optical measurement apparatus of claim 16, wherein the light power modulator is configured to spatially modulate the power of the first light beam to generate the first power-modulated light beam, and to spatially modulate the power of the second light beam to generate the second power-modulated light beam, wherein each of the first power-modulated light beam and the second power-modulated light beam is configured to scan the measurement target along a scan direction parallel to an upper surface of the measurement target.

19. The optical measurement apparatus of claim 16, wherein the first optical system includes a beam splitter configured to direct the first power-modulated light beam and the second power-modulated light beam incident on the measurement target, and to output the first reflected light beam and the second reflected light beam toward the second optical system, and an objective lens configured to condense the first power-modulated light beam and the second power-modulated light beam output from the beam splitter into the measurement target.

20. The optical measurement apparatus of claim 16, wherein each of the first reflector and the second reflector includes a beam splitter.

* * * * *